United States Patent [19]

Erman et al.

[11] Patent Number: 4,658,370

[45] Date of Patent: Apr. 14, 1987

[54] KNOWLEDGE ENGINEERING TOOL

[75] Inventors: Lee D. Erman; William J. Clancey, both of Palo Alto; Philip E. London, Cupertino; A. Carlisle Scott, Palo Alto; James S. Bennett, Palo Alto; Jay S. Lark, Palo Alto, all of Calif.

[73] Assignee: Teknowledge, Inc., Palo Alto, Calif.

[21] Appl. No.: 618,038

[22] Filed: Jun. 7, 1984

[51] Int. Cl.⁴ .............................................. G06F 15/18
[52] U.S. Cl. .................................. 364/513; 364/300; 364/900
[58] Field of Search .............. 364/130, 148, 300, 400, 364/513, 200 MS File, 900 MS File; 382/14, 15

[56] References Cited

U.S. PATENT DOCUMENTS

| | | | |
|---|---|---|---|
| 3,697,957 | 10/1972 | Barron | 364/148 |
| 3,716,840 | 2/1973 | Masten et al. | 364/200 |
| 4,286,330 | 8/1981 | Isaacson | 364/300 X |
| 4,326,259 | 4/1982 | Cooper et al. | 364/900 X |
| 4,368,509 | 1/1983 | Li | 364/149 X |
| 4,479,176 | 10/1984 | Grimshaw | 364/152 X |

OTHER PUBLICATIONS

Scott et al., "Explanation Capabilities of Production-Based Consultation Systems," STAN-77-593, Stanford University, Stanford, CA (1977).
William Clancey, "An Antibiotic Therapy Selector which Provides for Explanations," HPP-78-26 (working paper) Stanford University, Stanford, CA (1978).
William Clancey, "Tutoring Rules for Guiding a Case Method Dialog," HPP-78-25, Stanford University, Stanford, CA (1978).
Barr et al., "Transfer of Expertise: A Theme for AI Research," HPP-79-11 (working paper), Stanford University, Stanford, CA (1979).
Clancey et al., "Intelligent Computer-Aided Instruction for Medical Diagnosis," 3rd Computer Application in Medical Care, (Oct. 1979) pp. 175–183.
William Clancey, "Dialogue Management for Rule--Based Tutorials," HPP79-9 (working paper), Stanford University, Stanford, CA (1979).
Yu et al., "Antimicrobial Selection by a Computer," Journal of the American Medical Association, vol. 242 (Sep. 21, 1979) pp. 1279–1282.

(List continued on next page.)

Primary Examiner—Joseph Ruggiero
Attorney, Agent, or Firm—Leydig, Voit & Mayer

[57] ABSTRACT

A tool is used for knowledge engineers for building and interpreting a knowledge base having separate portions encoding control knowledge, factual knowledge, and judgmental rules. The tool has an inference engine applying the judgmental rules according to a built-in control procedure defining discrete states or control steps during a consultation with a user. The control knowledge is encoded in an applicative and imperative language defining control actions to be executed during interruption of the built-in control procedure at specified control steps. Since the control knowledge is explicit and results in the modification of data only in a precisely defined fashion, the tool can be used to build knowledge systems that can always explain their conclusions and reasoning, and that are intelligible and modifiable. To provide transparent representation of control knowledge as well as factual knowledge, the knowledge base is preferably organized into distinct frames which include the rules; control blocks separately encoding the control knowledge; and classes which become instantiated, attributes which take on values describing the class instances, class types, legal value hierarchies, and user-defined functions, which all encode factual knowledge. The knowledge engineer may provide control blocks to be executed at the start of the consultation, after the instantiation of specified classes, when a value for a specified attribute is to be determined, after a specified attribute is determined, and upon explicit invocation by another control block. The tool can also implicitly determine subsumed attributes.

69 Claims, 11 Drawing Figures

OTHER PUBLICATIONS

Scott et al., "Oncology Protocol Management Using the ONCOCIN System: A Preliminary Report," HPP-80-15, Stanford University, Stanford, CA (1980).
Shortliffe et al., "ONCOCIN: An Expert System for Oncology Protocol Management," HPP-81-7, Stanford University, Stanford, CA (1981).
Grenesereth et al., "The MRS Dictionary," HPP-80-24, Stanford University, Stanford, CA (1981).
Van Melle et al., "The Emycin Manual," HPP-81-16, Stanford University, Stanford, CA (1981).
William Clancey, "The Epistemology of a Rule-Based Expert System: A Framework for Explanation," HPP-81-17, Stanford University, Stanford, CA (1981).
William Clancey, "Methodology for Building an Intelligent Tutoring System," HPP-81-18, Stanford University, Stanford, CA (1981).
Clancey & Letsinger, "NEOMYCIN: Reconfiguring a Rule-Based Expert System for Application to Teaching," HPP-81-2, Stanford University, Stanford, CA (1982).
Clancey & Buchanan, "Exploration of Teaching and Problem-Solving Strategies, 1979-1982," HPP-82-8, Stanford University, Stanford, CA (1982).
London & Clancey, "Plan Recognition Strategies in Student Modeling: Prediction and Description," HPP-82-7, Stanford University, Stanford, CA (1982).
Genesereth and Smith, "Meta-Level Architecture," HPP-81-6, Stanford University, Stanford, CA (1982).
Clancey & Bock, "MRS/NEOMYCIN: Representing Metacontrol in Predicate Calculus," HPP-82-31, Stanford University, Stanford, CA (1983).
William Clancey, "Communication, Simulation and Intelligent Agents: Implications of Personal Intelligent Machines for Medical Education," HPP-83-3, Stanford University, Stanford, CA (1983).
William Clancey, "The Advantages of Abstract Control Knowledge in Expert System Designs," HPP-83-17, Stanford University, Stanford, CA (1983).
Bischoff et al., "Integration of a Computer-Based Consultant into the Clinical Setting," HPP-83-14, Stanford University, Stanford, CA (1983).
William Clancey, "GUIDON," Journal of Computer-Based Instruction, vol. 10 Nos. 1 & 2, (Summer 1983) pp. 8-15, [HPP-83-42].
Michael Genesereth, "The MRS Casebook," HPP-83-26, Stanford University, Stanford, CA (1983).
Diane Hasling, "Abstract Explanations of Strategy in a Diagnostic Consultation System," HPP-83-18, Stanford University, Stanford, CA (1983).
Slowman et al., "POPLOG: A Multilanguage Program Development Environment," *Info. Tech. Res. & Dev.*, vol. 2 (1983) pp. 109-122.

KNOWLEDGE ENGINEERING TOOL

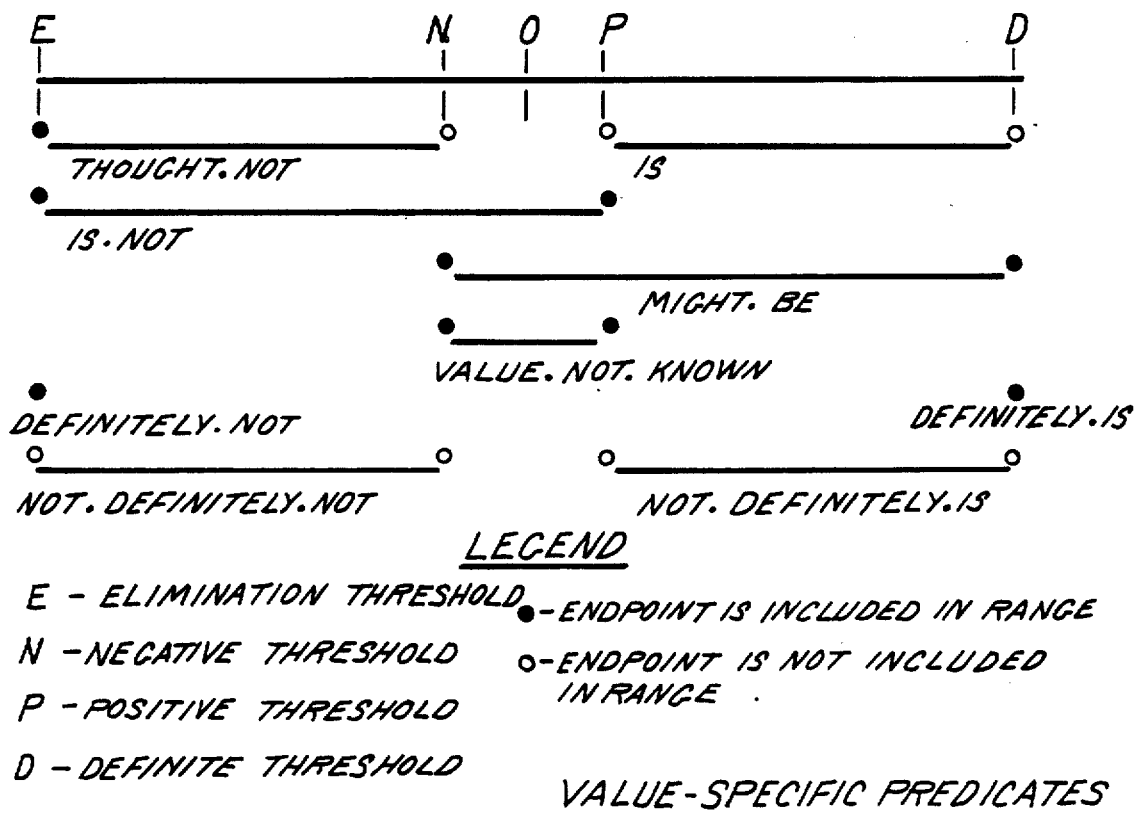
Fig. 9. VALUE-SPECIFIC PREDICATES
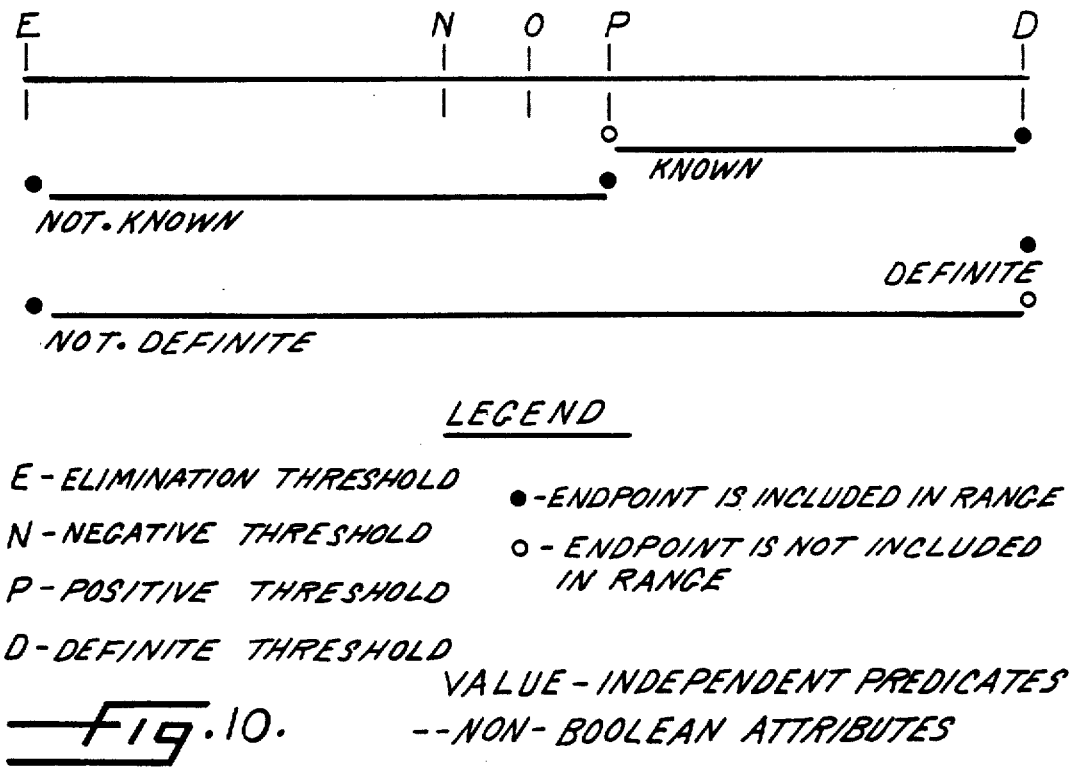
Fig. 10. VALUE-INDEPENDENT PREDICATES -- NON-BOOLEAN ATTRIBUTES

LEGEND

E - ELIMINATION THRESHOLD
N - NEGATIVE THRESHOLD
P - POSITIVE THRESHOLD
D - DEFINITE THRESHOLD

● - ENDPOINT IS INCLUDED IN RANGE
○ - ENDPOINT IS NOT INCLUDED IN RANGE

——— VALUE-INDEPENDENT PREDICATES
- - - NON-BOOLEAN ATTRIBUTES

KNOWLEDGE ENGINEERING TOOL

FIELD OF THE INVENTION

The present invention relates generally to artificial intelligence and knowledge engineering, and more particularly to a knowledge engineering tool for the development of large and complex knowledge systems.

BACKGROUND OF THE INVENTION

Knowledge systems are computer systems that emulate reasoning tasks by using an "inference engine" to interpret machine readable knowledge stored in a "knowledge base." Knowledge systems are becoming useful for problems that require diagnosis, recommendation, selection or classification. Such tasks have in the past been performed by human experts. It is becoming known that if the domain of the knowledge base, or scope of the problem, is sufficiently narrow and a sufficiently large body of knowledge is properly encoded in the knowledge base, then the knowledge system can achieve performance matching or exceeding the ability of a human expert. In such a case the knowledge system becomes an "expert system".

The first step in building a knowledge system involves encoding unstructured, often even unarticulated, knowledge into machine readable form. The encoding process is performed by a "knowledge engineer" who must be adept at both the milking of knowledge from conventional sources such as human experts and technical manuals, as well as the encoding of the knowledge into a machine readable knowledge system language. The ease of the encoding step is dependent on the particular syntax, intelligibility, and capabilities of the knowledge system language itself, as well as the availability of "knowledge engineering tools" used by the knowledge engineer to test, debug, augment and modify the knowledge base.

In particular, when designing a knowledge system in some application domain, the knowledge engineer works with a human expert to define the vocabulary and structure of the domain, the judgmental knowledge of the domain, and the method by which a user can access the knowledge in the knowledge base.

The vocabulary and structure of the domain must be defined both in general and with respect to the particular problem that the knowledge system will address. The vocabulary of the domain refers to the names of the individual objects and ideas that must be encoded in the knowledge base. The structure of the domain refers to relationships between the objects and the ideas in the domain. The judgmental knowledge of the domain refers to the rules of thumb or rules of inference which are used by a human expert to solve a problem involving uncertain knowledge or to restrict the scope of relevant knowledge or to direct the search for solutions among various possibilities covered by the knowledge base.

A user typically accesses knowledge in the knowledge system through a consultation. It is important that the consultation occurs in a manner that assures the user that the knowledge in the knowledge base is being properly considered and applied. It is particularly important, for example, that the user is not asked for redundant information and is given specific reasons why the knowledge system arrives at particular conclusions.

It is desirable that knowledge engineers have available to them high quality knowledge engineering tools since the purpose of a tool is to make a better product or knowledge system using less time and effort. In particular, the quality of the product is measured in terms of the reliability of the product, how easily the product can be maintained, and how easily the product can be extended to incorporate new features and additional knowledge.

In contrast to mechanical tools, a knowledge engineering tool is easily duplicated by copying. For this reason the knowledge engineering tool is typically used as a part of the final product or knowledge system. In such a case the performance and capabilities of the final product are dependent upon the performance and capabilities of the parts of the knowledge engineering tool which are incorporated into the knowledge system. For this purpose, the most important capability of the knowledge engineering tool is its ability to exercise control over the knowledge base. This degree of control is a measure of the range of inference strategies that are easily used by the inference engine. The knowledge engineering tool must also be capable of explicitly stating relevant knowledge in a machine readable form. This capability of the knowledge engineering tool to create a knowledge base effectively representing knowledge is known as declarative ability or range of propositional power.

The knowledge engineering tool includes a consultation driver portion which is usually incorporated into the knowledge system for conducting a consultation or question-and-answer session with the user. The consultation driver portion of the knowledge engineering tool is measured in a number of dimensions, including its interactive ability or ease of conducting a consultation, its justification or extent to which the system justifies its conclusions, its legibility or readability of the knowledge after any translation, and its judgmental capability in expressing uncertain knowledge and heuristic inferences. The consultation driver is also measured by its ability to offer help or guidance to the less experienced user.

Knowledge engineering tools have been available based on the EMYCIN tool developed from the Stanford University consultant program called MYCIN which diagnoses blood-born bacterial and meningitis infections and recommends appropriate therapy. As described in *The Emycin Manual* by Van Melle et al., Stanford University Report No. STAN-CS-81-885, Stanford CA 94305 (October, 1981) EMYCIN is a domain-independent system for constructing rule-based consultant expert system programs. Domain knowledge is represented in EMYCIN systems primarily as production rules, which are applied by a goal-directed backward-chaining control structure. Rules and consultation data are permitted to have associated measures of certainty, and incomplete data entry is allowed. The EMYCIN system includes an explanation facility displaying the line of reasoning followed by the consultation program, and answers questions from the client about the content of its knowledge base. To aid the system designer in producing a knowledge base for a domain, EMYCIN provides a terse and stylized language for writing rules; extensive checks to catch common user errors, such as misspellings; and methods for handling all necessary indexing chores.

The EMYCIN vocabulary of the domain defines a context-parameter-value triple as the elemental representation of an object or an idea. In particular, the context refers generally to instances of an object type, a parameter refers to an attribute of the object, and the value refers to the particular value of a parameter for a particular context instance. The domain is structured in terms of a hierarchy of context types called the "context tree." The context tree is defined by parent and offspring declarations for the context types and the instantiation of contexts is similar to the invocation of a subroutine for each context, the subroutine in effect being defined by various declarations in the context definition. A consultation is started by instantiating a root context and the branches from this root context define major steps in the consultation during which the offspring contexts of the root node are instantiated. Thus, the context definitions are used to structure the data or evidence required to advise the client about the root context. In the MYCIN medical diagnosis system, for example, the root context is called the "PATIENT" and the offspring of the root context are various types of cultures describing diagnostic tests that the doctor performs to isolate the organisms causing an infection in the patient.

Besides consultation control, the context tree is used to organize the distinguished components of some object. Similarly, the context tree is useful for representing distinguished events or situations that happened to an object.

Although the context tree is used for control purposes, the judgmental rules in EMYCIN are also used for controlling the order in which tasks are performed. In addition to performing reasoning processes, the rules in EMYCIN classify case data in a symbolic fashion.

It has been recognized that EMYCIN has substantial limitations in its ability to emulate a human expert. In the field of medical diagnosis, Stanford researchers found that MYCIN was not especially suited to teaching medical diagnosis strategies since the method by which EMYCIN represented inference strategies and knowledge about infectious diseases was not well-suited for testing hypotheses. In response to this, the Stanford researchers developed an expert system called NEOMYCIN in which the hypothesis-testing strategy of medical diagnosis was structured in terms of tasks. Each task corresponded to a higher level goal invoking higher level rules stating methods for achieving the higher level goals.

The NEOMYCIN domain rules included four particular kinds of domain rules. These kinds of domain rules were base-level causal rules, trigger rules for directing attention to specific causes, data/hypothesis rules that associated data with particular hypotheses only when sufficient circumstantial data accummulated, and screening rules which put restrictions on data.

The Stanford researchers claimed to have learned several lessons through the development of NEOMYCIN. For a program to articulate general principles, it was concluded that strategy should be represented explicitly and abstractly. Strategies should be made explicit by means of a representation in which the control knowledge is explicit and is not imbedded or implicit in the domain knowledge, such as in rule clause ordering. Strategies should be made abstract by making meta-facts and tasks domain-independent. Also, if control is to be assumed by the tasks and meta-facts, then all control must be encoded in that way, because implicit actions in functions or hidden chaining in domain level rules lead to situations which do not fit into the overall task structure and cannot be adequately explained.

From these conclusions based on NEOMYCIN development, the Stanford researchers hypothesized general statements about advantages of abstract control knowledge in expert system design. Representing control knowledge abstractly, separately from domain facts and relations, was said to make the design more transparent and explainable. A body of abstract control knowledge was said to provide a generic framework for constructing knowledge bases for related problems in other domains and also provide a useful starting point for studying the nature of strategy. Moreover, it was said that an important design principle for building expert systems is to represent all control knowledge abstractly, separate from the domain knowledge it operates upon. In this respect, the control knowledge specifies when and how a program is to carry out its operations, such as pursuing a goal, focusing, acquiring data, and making inferences. See, for example, William J. Clancey, "The Advantages Of Abstract Control Knowledge In Expert System Design," Heuristic Programming Project, Computer Science Department, Stanford University, Stanford, CA 94305, Report No. HPP-83-17, March, 1983.

SUMMARY OF THE INVENTION

The primary object of the invention is to provide an advanced knowledge engineering tool for use by experienced knowledge engineers to build complex knowledge systems requiring diagnosis, recommendation, selection, or classification of information.

Another object of the invention is to provide a knowledge engineering tool that naturally induces the knowledge engineer to identify, separate, and encode control knowledge so that knowledge systems built with the tool are transparent and explainable, and are easier to maintain, modify and upgrade.

Yet another object of the invention is to provide a knowledge engineering tool with knowledge domain structures which efficiently encode predefined relationships between objects and ideas in the domain and relieve the knowledge engineer of making a number of design decisions in the creation of the knowledge base.

Briefly, in accordance with the primary aspect of the invention, the knowledge base editor and the knowledge base interpreter of a knowledge engineering tool define and operate upon a knowledge base separately encoding procedural, factual, and judgmental knowledge. The procedural knowledge is encoded as sequences of problem solving steps included in control blocks. The control blocks are written in an applicative and imperative control language. The factual and judgmental knowledge is encoded in a declarative language.

Preferably the factual knowledge declarations include descriptions of classes that become instantiated to particular objects or ideas, attributes that define the instantiations of particular classes and become set to particular values during a consultation, and declarations of hierarchical structures of classes, class instances, attributes, and values.

Preferably the execution of the imperative control language in a control block can be interrupted to invoke another control block either explicitly or implicitly when a value for a particular attribute is sought or determined, or when an instance of a particular class is created.

In accordance with another aspect of the invention, the imperative control language cooperates with structures of declarative factual knowledge that organize the knowledge base and provide built-in control. These structures include class hierarchies, hierarchies of subsuming attributes, and hierarchies of values. The imperative control language and structures simplify the knowledge engineering task and make the knowledge system and its reasoning during a consultation easier to review, understand, and explain. The knowledge engineering tool provides for the categorization and expression of various kinds of knowledge so that the knowledge need not be intermingled and need not be expressed or specified outside of the standard provisions of the tool.

BRIEF DESCRIPTION OF THE DRAWINGS

Other objects and advantages of the invention will become apparent upon reading the following detailed description and upon reference to the drawings in which:

FIG. 9 illustrates the meaning of various value-specific predicates in terms of their relationship to the range of the certainty factor for the value;

FIG. 10 is a diagram illustrating the meaning of several value-independent predicates for non-Boolean attributes in terms of their relationship to the certainty factor for the value.

Figure 1:
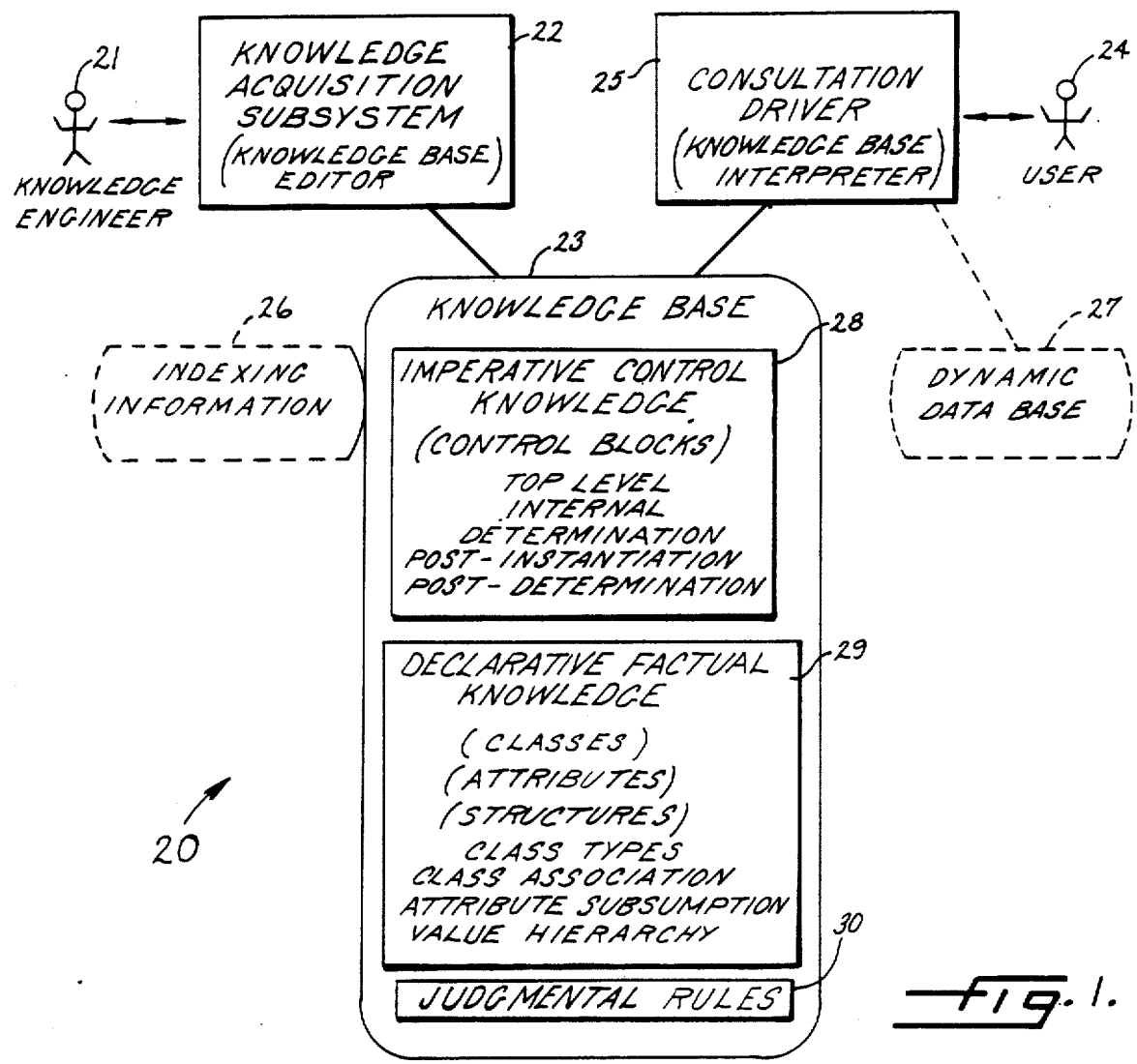
FIG. 1 is a schematic diagram illustrating the use of an exemplary embodiment of the knowledge engineering tool loaded into a general purpose digital computer.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to FIG. 1, there is shown a schematic diagram generally designated 20 illustrating the use of the knowledge engineering tool loaded into a general purpose digital computer for creating and using a knowledge system. To create a knowledge system, the knowledge engineer 21 uses the knowledge engineering tool as a knowledge acquisition subsystem or knowledge base editor 22 to create a knowledge base 23. In the process of building the knowledge base, the knowledge engineer 21 encodes unstructured knowledge from human experts, technical manuals, and other sources into machine readable form which is deposited into the knowledge base 23. When used as a knowledge acquisition subsystem 22, the knowledge engineering tool edits and incrementally updates the knowledge base, and checks to some extent that the knowledge is properly encoded into machine readable form.

To allow the knowledge engineer 21 to run test cases, and also to permit a user 24 to access the knowledge base 23 once the knowledge base has been constructed,, the knowledge engineering tool includes a consultation driver 25 which interprets the knowledge base and typically conducts a question-and-answer session called a consultation. To speed up the interpretation process, the consultation driver 25 searches the knowledge base 23 by using precomputed indexing information 26, which is created by the knowledge engineering tool from the knowledge base 23. Also, during a test consultation with the knowledge engineer 21 or with the user 24, the consultation driver 25 accesses and updates a dynamic data base 27 which stores intermediate results along with information identifying how the intermediate results were determined.

The present invention concerns a knowledge engineering tool having a knowledge acquisition subsystem 22 and a consultation driver 25 which generates and uses a knowledge base 23 encoding knowledge in a particularly advantageous format which is easily understood by the knowledge engineer 21 and is efficiently interpreted by the consultation driver 25.

In accordance with an important aspect of the invention, the knowledge base is written in a specialized programming language that allows the separation of imperative control knowledge 28 from declarative domain knowledge 29 and judgmental rules 30. In particular, the imperative control knowledge 28 is encoded into control blocks which specify how a consultation is run and which influence the order in which the judgmental rules 30 are applied.

In accordance with another aspect of the present invention, a particularly advantageous "frame system" is provided for representing objects and concepts referenced by the judgmental rules 30. This frame system provides domain knowledge declarations including descriptions of classes that become instantiated to particular objects or ideas, attributes that define the instantiations of particular classes and become set to particular values during a consultation, and declarations of hierarchical structures of class types, class instances, attributes, and values.

Figure 2:
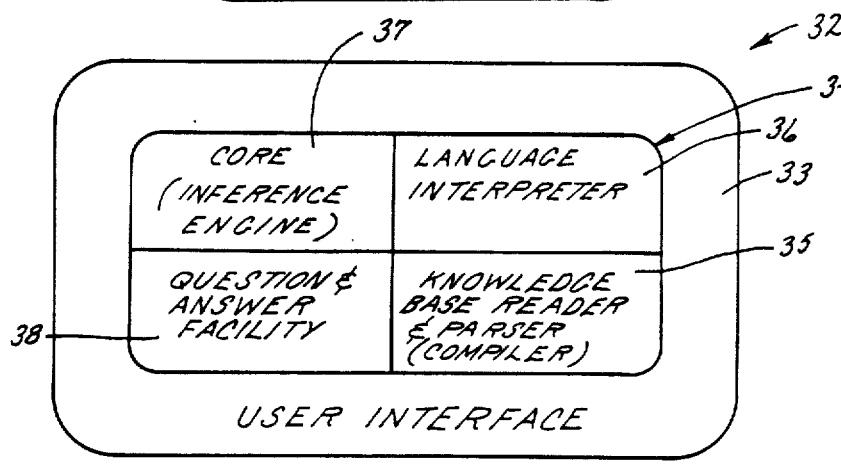
FIG. 2 is a schematic diagram of the knowledge engineering tool.

It should be noted that FIG. 1 shows the knowledge engineering tool having been loaded in a general purpose digital computer. The knowledge engineering tool itself is a computer program containing a number of modules or subroutines. A very general block diagram of a typical assembly of modules or subroutines in shown in FIG. 2. The knowledge engineering tool generally designated 32 has a few top level subroutines constituting a user interface 33 for invoking or calling upon lower level modules or subroutines generally designated 34. The user interface 33 recognizes certain top level commands from the user to call on particular ones of the lower level modules 34 to carry out certain desired functions.

The lower level modules 34 may be subdivided into one of four general catagories depending upon their function in the knowledge engineering tool. To convert the knowledge base 23 to a form that is easily recognized and executed by the computer, the knowledge engineering tool includes knowledge base reader and parser subroutines 35 which to some degree compile the knowledge base. Once the knowledge base is in an internal format, it is recognizable by language interpreter subroutines 36 for interpreting rules, control blocks, and user-defined functions. As the internal format knowledge base is interpreted and executed, core subroutines 37 are executed which define built-in functions and which comprise an inference engine for applying the judgmental rules. During the execution of the control blocks, the knowledge engineering tool 32 communicates with the user 24 or the knowledge engineer 21 through modules or subroutines comprising a question-and-answer facility 38.

In order to understand how the knowledge engineering tool 32 operates, it is necessary to become familiar with a typically consultation, a typical knowledge base, the syntax of the language of the knowledge engineering tool, and the procedure for executing control blocks and applying the judgmental rules.

Included as Appendix I to the present specification is a listing of a miniature knowledge base for a "Car Repair Advisor" knowledge system. This miniature knowledge system will diagnose certain problems with the charging system of a car. The Car Repair Advisor asks the user to perform various tests and then recommends a course of action to fix the problem. Included as Appendix II to the present specification is a typescript of a "Car Repair Advisor" consultation. In this typescript, the user input is underlined to distinguish it from the questions and advice generated by the Car Repair Advisor knowledge system.

A brief glance at the Car Repair Advisor knowledge base in Appendix I shows that it includes: a definition of a class called "CAR"; a definition of a control block named About.Car; definitions of Rule 400, Rule 408, Rule 409, Rule 900, Rule 902, and Rule 903; and definitions of the attributes "symptoms", "cause.of.problem", "recommendations", "fan.belt.test", "loaded.field.terminal.test", and "oscilloscope.test".

Figure 3:
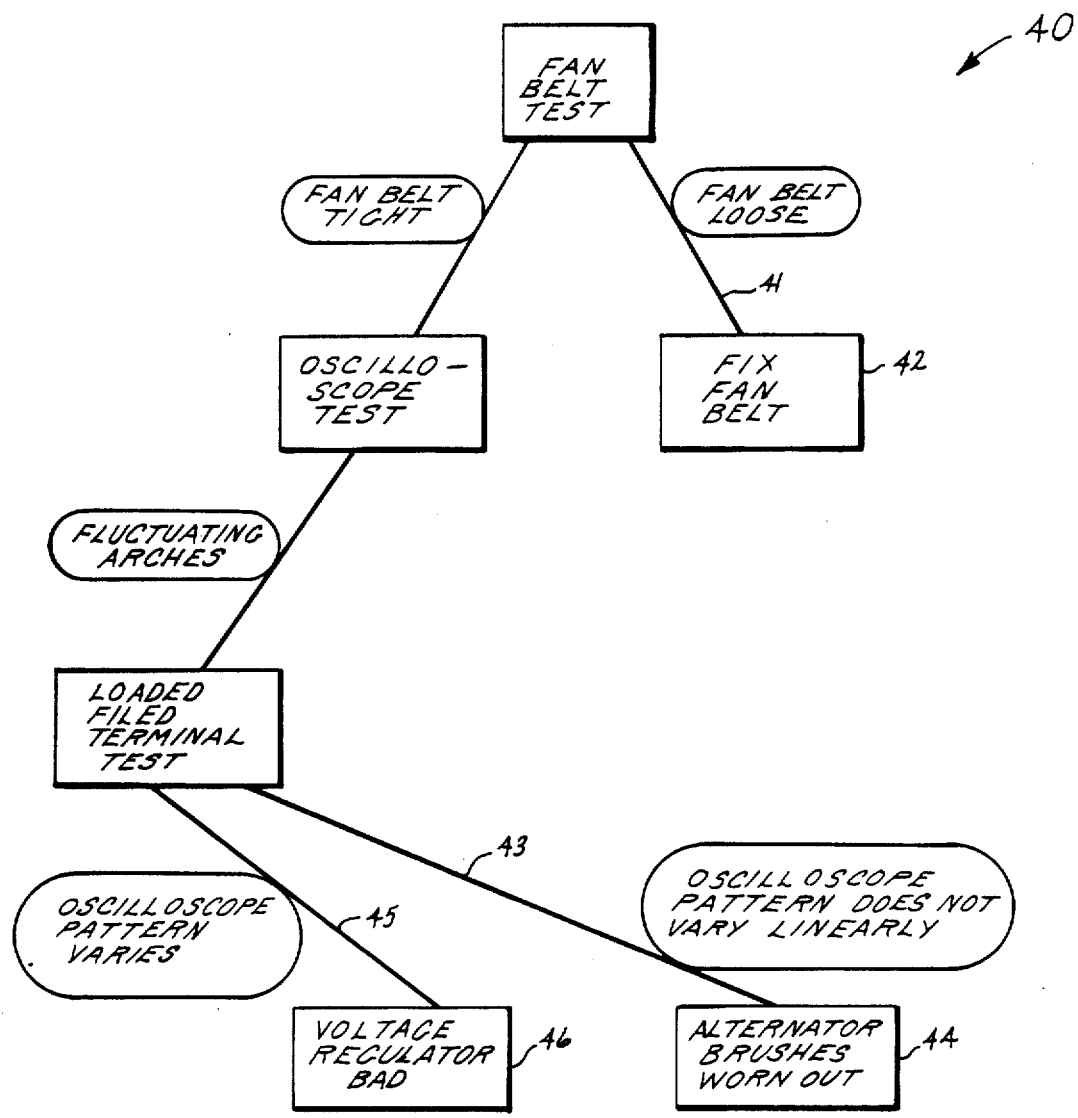
FIG. 3 is decision tree illustrating the encoding of judgmental knowledge in rules.

The judgmental rules in the Car Repair Advisor knowledge base include heuristic knowledge about how to diagnose a problem with the charging system of a car regardless of the particular procedure for consulting with the user. The judgmental knowledge encoded in the rule is schematically shown by a decision tree generally designated 40 in FIG. 3. Each path through the decision tree ending in a terminal node represents a particular rule in the knowledge base. Path 41 ending in the terminal node 42 corresponds to Rule 400 which translated states, "if the fan belt is loose, then we know the problem". Path 43 ending in terminal node 44 corresponds to Rule 409 which translated states that "if the pattern observed on the oscilloscope is fluctuating arches, and the alternator does not respond properly to a variable ground on the ground field terminal, then the alternator brushes are worn out." The path 45 ending in the terminal node 46 corresponds to Rule 408 which when translated states "if the fan belt is not loose and the oscilloscope test is fluctuating arches and the oscilloscope pattern varies in response to a variable ground, then the voltage regulator is bad."

Figure 4:
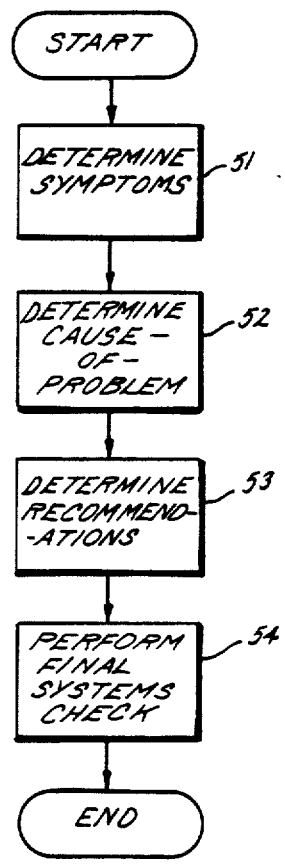
FIG. 4 is a flow chart for a control block for a diagnostic consultation.

The control knowledge specifying how a consultation is carried out is encoded in a control block, "About.Car". Shown in FIG. 4 is a flow chart of the control sequence. This flow chart should be viewed in light of the typescript of the Car Repair Advisor consultation in Appendix II. In the first step 51, the symptoms of the problem are determined. The user is asked "What is wrong with this car?" Next, in step 52, the cause of the problem is determined. The user is asked to rotate the pulley attached to the alternator to perform a fan belt test, and is also asked to perform an oscilloscope test and a loaded field terminal test. These tests gather sufficient data to apply the rules in the knowledge base so that the rules may be applied or chained to reach one of the terminal nodes 42, 44, or 46 in the decision tree 40 of FIG. 3 to determine the cause of the problem. For the data received from the user during the consultation of Appendix II, the cause of the problem is determined to be that the alternator brushes are worn out.

Next in step 53 of the control procedure of FIG. 4, a recommendation is determined in response to the cause of the problem. In particular, Rule 902 of the knowledge base in Appendix I is applied to determine the recommendation that "the alternator brushes are worn out. To fix the problem, please replace the alternator brushes." In the final step 54 of the control sequence, the user is asked to perform a final systems check.

According to an important aspect of the invention, the control procedure such as that shown in FIG. 4 is specified in a procedural language defining the control blocks. The procedural language indicates the actions that the knowledge system should perform, the order in which these actions should be performed, and the conditions under which these actions should be performed.

Reprinted below is a simplified definition of the single control block for the Car Repair Advisor of Appendix I and its translation:

---

DEFINE CONTROL.BLOCK About.Car

::TRANSLATION "diagnose and repair a car"
::INVOCATION TOP.LEVEL
::BODY
begin vars C:CAR;
display spaces (15) ! "Welcome to the Car Repair Advisor.";
create.instance CAR called C;
determine symptoms[C];
determine cause.of.problem[C];
determine recommendations[C];
display recommendations[C];
end;
END.DEFINE
Translation:
In order to diagnose and repair a car, do the following:
Display "Welcome to the Car Repair Advisor."
Find out about a car called C.
Determine the symptoms that were observed for the car C.
Determine the cause of the problem with the car C.
Determine the recommendations for fixing the problem.
Display the recommendations.

---

Note that the definition consists of entries in "slots" of the control block "frame". The frame has three distinct slots labeled TRANSLATION, INVOCATION, and BODY. In general the knowledge base is comprised of frames, each frame beginning with "DEFINE" and ending with "END.DEFINE." The slot labels are identified by two prefixing colons.

The "INVOCATION" slot of the control block identifies that the control block "About.Car" is "TOP.-LEVEL" meaning that it is the first control block to be executed at the start of a consultation.

The "BODY" slot of the control block includes the procedural language specifying what actions the Car Repair Advisor performs during a consultation.

The procedural language of the control block includes references to the vocabulary of the domain that is relevant to the knowledge system. This vocabulary of the domain is defined by declarations of factual knowledge in the knowledge base that define "classes" of domain objects, "attributes" of "instances" of the classes, and "values" for the attributes.

A "class" is a representation of a type of object, event or idea. During a consultation, the knowledge system considers particular examples of the class. These particular examples are called "instances."

The focus of a Car Repair Advisor consultation, for example, is represented by the class "CAR" whose definition is shown below:

| DEFINE CLASS CAR | |
|---|---|
| ::NUMBER.INSTANCES | 1 |
| ::ANNOUNCEMENT | new line( )! indent( )! "This car will be referred to as: " !instance.name(CAR)! new line( ) ! outdent( ) |
| ::CLASS.TRANSLATION | "a car" |
| ::PLURAL.CLASS.TRANSLATION | "the cars" |
| ::BLAND.INSTANCE.TRANSLATION | "the car" |
| ::FULL.INSTANCE.TRANSLATION | "this car" |
| END.DEFINE | |

Each time the Car Repair Advisor consultation is run, an instance of the class CAR is generated by the "create.instance CAR called C" statement in the "About.Car" control block. In the consultation of Appendix II, the instance of the class CAR is named "car #1". The slot "NUMBER.INSTANCES" tells the knowledge system that only one instance of the class CAR is of interest at any given time. The translation slots tell the system how to generate announcements and questions during the consultation that refer to the class. In general, a class definition will include the slots shown for the class definition of CAR but only the NUMBER.INSTANCES slot is required. The knowledge engineer may specify "ANY" in this slot to permit the knowledge system to generate any number of instances of a class.

An "attribute" is a piece of information that the knowledge system needs to know about each of the instances of a particular class. The definition or declaration of a particular attribute specifies the possible values that the attribute may have and how the system should determine the value of the attribute.

One of the key pieces of information that the Car Advisor will need to determine is the cause of the problem with the car. This piece of information is represented by the attribute "cause.of.problem" which is defined as follows:

| DEFINE.ATTRIBUTE | cause.of.problem |
|---|---|
| ::DEFINED.ON | CAR |
| ::TRANSLATION | "the cause of the problem with" ! instance.trans(CAR) |
| ::TYPE | Text |
| ::LEGAL.VALUES | {fan.belt.slipping, voltage.reg. bad, alternator.brushes.worn-out} |
| ::LEGAL.MEANS | {TRY.RULES} |
| ::DETERMINATION.MEANS | {TRY.RULES} |
| END.DEFINE | |

The slot "DEFINED.ON" declares that the attribute "cause.of.problem" is a piece of information about the instance of the class CAR. In general, an attribute may be defined on a number of class instances so that the attribute is a piece of information about a combination of instances of the different classes. The slot "TRANSLATION" tells the system how to generate announcements and questions about the attribute "cause.of.problem" during the consultation, as was the case with the class declaration for CAR. Note that the translation of the attribute "cause.of.problem" incorporates the "instance.trans(CAR)" translation declared for the class CAR. The slot "TYPE" identifies the attribute as text. Other types of attributes include "integer" denoting that the value of the attribute is an integer number, "real" denoting that values of the attribute is a real number, and "Boolean" denoting that the value of the attribute is either true or false. The slot "LEGAL.VALUES" defines the set of values that the attribute may assume. This set of values is useful for consistency checking. If the user is asked for the value of the attribute "cause.of.problem", for example, the user's response must match one of the legal values or the value "unknown." The slot "LEGAL.MEANS" defines the set of permitted methods for determining the values for the attribute. For the attribute "cause.of.problem", values can be determined only by using rules. If the "LEGAL.MEANS" slot included the element "QUERY.USER", then the user could be asked for a value for the attribute "cause.of.problem". The slot "DETERMINATION.MEANS" defines the set of methods that should be used to determine a value for the attribute, in the indicated order, unless otherwise specified by the knowledge engineer. In general, an attribute definition will include the slots shown for the definition of the attribute "cause of problem," but only the DEFINED.ON and TYPE slots are required.

Attributes are assumed to be single valued. Non-Boolean attributes, however, can be defined as multivalued using a MULTIVALUED slot. In the Car Repair Advisor, the attribute "symptoms" is defined as multivalued and its defintion includes the following slots:

| ::MULTIVALUED | true |
|---|---|
| ::MULTIVALUED.SEEK.TYPE | ALL.VALUES |

If an attribute is defined to be multivalued, all values will be sought for the attribute unless the MULTIVALUED.SEEK.TYPE slot for the attribute is defined as "INDIVIDUAL.VALUES."

The Car Repair Advisor knowledge base in Appendix I includes a fourth type of frame for defining rules. In general, the frames define what are called "objects" of the knowledge base. The previous three objects considered were control blocks, classes, and attributes. A representative frame for a rule is reprinted below:

| DEFINE RULE | Rule400 |
|---|---|
| ::APPLIED.TO | C:CAR |
| ::PREMISE | fan.belt.test[C] |
| ::CONCLUSION | cause.of.problem[C]= fan.belt.slipping <1.0> |
| END.DEFINE | |

The frame for Rule 400 above consists of all of the required slots for a frame defining a rule. The APPLIED.TO slot includes as its entry a sequence of "instance variable declarations" separated by commas. For Rule 400, the single instance variable declaration includes an instance variable "C" followed by a colon and the name of the class CAR for which the instance variable is declared. Instance variables are needed to convert the attributes in the PREMISE and CONCLUSION of the rule definition to "attribute descriptions" which can be evaluated. Each attribute description includes an attribute followed by a bracketed list of instance variables corresponding to the classes upon which the attribute is defined. In other words, an attribute is analogous to an array having indicies corresponding to the values of the instance variables or particular instantiations of the corresponding classes.

The PREMISE slot includes a Boolean expression. For Rule 400, the Boolean expression comprises the attribute description of the Boolean type attribute "fan.-belt.test". If the Boolean expression in the PREMISE slot is true, the conclusion of the rule is asserted.

The CONCLUSION slot entry includes the conclusion of the rule. The conclusion of the rule may include a number of conclusion statements that set an attribute description to one or more values and associated certainty factors. The certainty factors are enclosed in "< >".

Certainty factors range from −1 to +1, −1 indicating the associated value is known to be certainly false, 0 indicating the value is totally uncertain, and +1 indicating that the value is known to be certainly true. The certainty factor is assumed to be +1 if a certainty factor is not explicitly specified. Since every value has an associated certainty factor, the rules can perform heuristic and judgmental reasoning. Conclusions can be reached on the basis of uncertain and incomplete knowledge and the strength or validity of the final result can be indicated by an associated certainty factor.

When an individual rule is applied, the certainty factors associated with the premise and the conclusion are combined to arrive at a cumulative certainty factor of the concluded value or values. As noted above, a multi-valued attribute may have more than one value for a set of instances upon which the attribute is defined. For a single-valued attribute, however, different values concluded by a rule or rules are considered as competing hypotheses. The application of rules concluding values for an attribute terminates if the attribute is single valued and if a certainty factor is obtained of at least a "definite" threshold, for example, 1.0. Moreover, a premise of a rule is not considered true unless its certainty factor exceeds a "positive" threshold, for example, 0.2.

Before a rule is applied the conclusion statements are checked for consistency. All attributes that are concluded must have TRY.RULES in their LEGAL.-MEANS slots. Also, the DEFINED.ON slot for each of the concluded attributes must match the APPLIED.TO slot of the rule.

According to an important aspect of the present invention, the language of the knowledge engineering tool enables the knowledge engineer to define a plurality of different kinds of relationships among the classes, attributes, and values in the domain. As noted above, these relationships are structures of the domain and are part of the declarative domain knowledge 29 in FIG. 1.

Classes that share common characteristics can be grouped into structures called "class types." By defining a class type, the knowledge engineer can advantageously define attributes that identify the common characteristics, and these common attributes can be defined on the class type. Then the common attributes, which are shared by the classes of the class type, need not be explicitly defined on the classes of the class type. The attributes specific to particular classes in the class type, however, are still defined on those particular classes.

The class types are defined by separate class type declarations in the knowledge base. Suppose, for example, that it is desired to extend the Car Repair Advisor so that it will advise a mechanic how to repair a number of types of motor vehicles such as cars, trucks, jeeps, and buses. In this case, the knowledge base should include separate class declarations or frames for the classes CAR, TRUCK, JEEP, and BUS. In order to define a common attribute such as "engine" on the class type, the class type is given a name such as "VEHICLE" and declared to be a class type as follows:

| DEFINE CLASS.TYPE | VEHICLE |
|---|---|
| ::CONTAINS | {CAR, TRUCK, JEEP, BUS} |
| ::CLASS.TYPE.TRANSLATION | "a vehicle" |
| ::PLURAL.CLASS.TRANSLATION | "the vehicles" |
| ::BLAND.INSTANCE.TRANSLATION | "the vehicle" |
| END.DEFINE | |

The slot "CONTAINS" is a required slot in the frame defining the class type and the slot includes the set of classes in the class type. The knowledge engineer can also create overlapping class types, or hierarchies of class types, by listing class types as well as classes in the set defined in the "CONTAINS" slot.

An attribute is defined on a class type by including the class type in the "DEFINED.ON" slot for the attribute. An attribute "manufacturer", for example, is defined on the class type "VEHICLE" in the following frame:

| DEFINE ATTRIBUTE | manufacturer |
|---|---|
| ::DEFINED.ON | VEHICLE |
| ::TRANSLATION | "the manufacturer of the vehicle" |
| ::TYPE | Text |
| ::PROMPT | "What is the manufacturer of " ! instance.trans (VEHICLE) ! "?" |
| ::LEGAL.MEANS | {QUERY USER} |
| ::DETERMINATION.MEANS | {QUERY USER} |
| END.DEFINE | |

Since classes and class types have similar properties with respect to attributes and hierarchies of classes and class types, both classes and class types typically are given names including captial letters. Attributes, on the other hand, typically are given names including lower case letters.

Class types are not the only hierarchical relationships among classes. Another important relationship between classes and class types in the "parent-offspring" relationship. When the "parent-offspring" relationship exists, every instance of an offspring class by definition has a corresponding instance of its parent class. The utility of the "parent-offspring" relationship derives from the fact that once the knowledge engineer tells the knowledge engineering tool that the relationship exists, the knowledge engineering tool will insure that every instance of an offspring class will have a corresponding instance of its parent class. The knowledge engineering tool keeps track of which parent instance corresponds to each offspring instances by means of a Boolean association attribute defined on both the offspring and parent class.

The association attribute's value is determined when an instance of the offspring class is created. The value of the association attribute is true for the corresponding pairs of offspring/class instances, and the value of the association attribute is false for non-corresponding pairs of offspring/class instances. Note that a particular offspring instance and a particular class instance need not be corresponding since for the case of multiple offspring instances, each offspring instance of the same offspring class might have a different corresponding parent instance. Also, a parent instance might not have any corresponding offspring instance.

The knowledge engineer defines the parent-offspring relationship by including an ASSOCIATION slot in the definition of the offspring class. The ASSOCIATION slot entry is the name of the associating attribute. Consider, for example, the following definition of the offspring class "ENGINE":

```
DEFINE CLASS ENGINE
  ::NUMBER.INSTANCES      1
  ::ASSOCIATION           engine.of
  ::CLASS.TRANSLATION     "an engine"
END.DEFINE
DEFINE ATTRIBUTE          engine.of
  ::DEFINED.ON            CAR, ENGINE
  ::TYPE                  Boolean
  ::TRANSLATION           instance.trans(ENGINE)!
                          "is the engine of"
                          ! instance.trans(CAR)
END.DEFINE
```

Note that the entry of the DEFINED.ON slot of the definition of the association attribute "engine.of" has the parent class first, then the offspring class. Also, the TYPE slot must be Boolean for an association attribute. When a class type is used as the parent, all classes contained in the class type are potential parent classes of the offspring class or classes. When a class type is used as the offspring, all classes contained in the class type are offspring of the parent class (or potential parent classes). The NUMBER.INSTANCES slot for the offspring class definition indicates the number of offspring instances for each parent instance.

When an instance of an offspring is created from a control block, the corresponding parent instance must be specified. The "About.Car" control block, for example, could contain the following create statements:

```
    . . .
    create.instance CAR called C1;
    create.instance ENGINE called E1
        whose.parent.is C1;
    create.instance CAR called C2;
    create.instance ENGINE called E2
        whose.parent.is C2;
    . . .
```

For this example it is assumed that the NUMBER.INSTANCES slot of the definition for the class CAR has an entry of 2 or more, or ANY. The association attribute "engine.of" is useful in a rule, for example, which links a defective engine with the cause of the problem with the corresponding car:

| DEFINE Rule401 | |
| --- | --- |
| ::APPLIED.TO | C:CAR |
| ::PREMISE | exists (E:Engine{ engine.defective[E]) and engine.of[C, E] |
| ::CONCLUSION | cause.of.problem[C] = engine.problem |
| END.DEFINE | |

The rule is conditioned by the value of the association attribute "engine.of" to insure that an engine problem is concluded only for the particular car instance having the defective engine instance.

It should be noted that instances can be created implicitly when rules are applied as well as explicitly by a "create.instance" or a "create.all.instances" statement in a control block. In accordance with the method of goal-directed instance creation, when a rule is applied having in its premise an instance variable of an uninstantiated class, the class is implicitly instantiated so that the rule may be applied. During goal-directed instance creation a number of instances of the class are created corresponding to the NUMBER slot for the class definition. If the NUMBER slot contains "ANY," however, the user is asked for the number of instances to create.

Goal-directed instance creation for an offspring class automatically creates offspring instances for each parent instance. Moreover, the parent classes are instantiated if they are not already instantiated.

Another important structure of factual knowledge provided by the knowledge engineering tool is a hierarchy of subsumed attributes. According to the subsumption relationship between attributes, the value of a "subsumed" attribute is relevant only if a condition represented by another attribute, the "subsuming" attribute, is known to be true. Note that the subsumption relationship requires the subsuming attribute to be a Boolean type attribute defined on the same classes or class types as the subsumed attribute. The subsumption relationship arises primarily in two different situations. In one situation, the subsuming attribute is a generalization of the subsumed attribute. The attribute "has.radio", for example, is true for a car with a radio. The attribute "has.radio" is more general than the attribute "am.fm.radio" which is true of the radio picks up both AM and FM stations. Note that it is not efficient to ask the user or to apply rules to determine "am.fm.radio" if the car has no radio.

In another situation, the subsuming attribute is a precondition for the subsumed attribute. A number of tests, for example, can be performed on a car only if the user has a particular piece of test equipment. An attribute representing whether the test equipment is available will subsume the attributes representing the results of the individual tests.

The knowledge engineer defines the subsumption relationship by SUBSUMED.BY slots in the definition of the subsumed attributes. The entry of a SUBSUMED.BY slot is the name of the subsuming attribute. The definition of the attribute "am.fm.radio", for example, has a SUBSUMED.BY slot with the entry "has.radio." Hierarchies of subsuming attributes or conditions are built up implicity in the same fashion. The attribute "am.fm.tape.radio", for example, can be defined as subsumed by the attribute "am.fm.radio," and it will be implicitly subsumed by the attribute "has.radio" even if the attribute "am.fm.tape.radio" is not defined as subsumed by the attribute "has.radio", so long as "am.fm-.radio" is defined as subsumed by "has.radio".

When determining the value of an attribute during a consultation, the consultation driver (25 FIG. 1) first checks whether the attribute has a SUBSUMED.BY slot. If it does, the attribute is a subsumed attribute and the subsuming Boolean attribute is checked to determine whether it is false. For each instance for which the subsuming attribute is false, if the subsumed attribute is of a Boolean type, it is determined to be false. If the subsuming attribute is not of a Boolean type, it is determined that the attribute has each of its LEGAL.VALUES with a certainty factor of −1, or the attribute is simply marked "determined" if no legal values are stored in the dynamic data base (27 FIG. 1) so as to preclude future attempts to determine values for the attribute.

When a value for a subsumed attribute is otherwise concluded, for example by a rule, it implies that the condition represented by the subsuming attribute is true. Therefore, the subsuming attribute is concluded to be true.

When the consultation driver (25 FIG. 1) concludes that the condition represented by a subsuming attribute is false, the consulation driver makes a note in the dynamic data base (27 FIG. 1) for each subsumed attribute so that values will not be sought for the subsumed attributes.

In general, it can be said that the consultation driver (25 FIG. 1) uses a hierarchy of subsumption relationships to permit the rules to reference all levels of the hierarchy. If one rule, for example, concludes that the cause of the car problem is not "wiring.problem", another rule that tests whether the problem is "broken.-wire" will not succeed. Similarly, if one rule concludes that the cause of the car problem is "battery.dead", another rule that tests the subsuming attribute "battery.-problem" will succeed.

Another structure of factual knowledge provided by the knowledge engineering tool is a legal value hierarchy for an attribute. The LEGAL.VALUES slot in an attribute definition for a text type attribute may include the names of legal values hierarchies as well as the names of legal values. A legal value hierarchy is an object of the knowledge base defining the hierarchy in terms of subvalues which may themselves be legal value hierarchies. A legal value hierarchy should be used if more than one attribute has the same set of legal values, or if legal values are hierarchically related.

Figure 5:
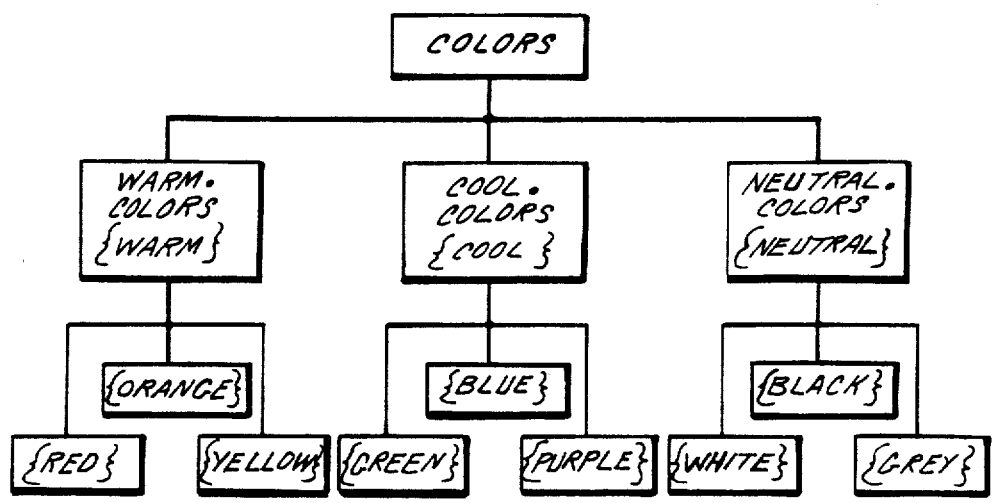
FIG. 5 is a hierarchical diagram illustrating the use of a legal value hierarchy.

Consider, for example, the legal values for the attribute "paint.color" describing the pain color for a particular model of car. The set of colors can be subdivided generally into subsets of warm colors, cool colors, and neutral colors. This hierarchy of legal values is illustrated in FIG. 5 and is defined in the knowledge base as follows:

| | |
|---|---|
| DEFINE VALUE.HIERARCHY | colors |
| ::TRANSLATION | "the colors" |
| ::SUBVALUES | {warm.colors, cool.colors, neutral.colors} |
| END.DEFINE | |
| DEFINE VALUE.HIERARCHY | warm.colors |
| ::VALUE | warm |
| ::TRANSLATION | "the warm colors" |
| ::SUBVALUES | {red, orange, yellow} |
| END.DEFINE | |
| DEFINE VALUE.HIERARCHY | cool.colors |
| ::VALUE | cool |
| ::TRANSLATION | "the cool colors" |
| ::SUBVALUES | {green, blue, purple} |
| END.DEFINE | |
| DEFINE VALUE.HIERARCHY | neutral.colors |
| ::VALUE | neutral |
| ::TRANSLATION | "the neutral colors" |
| ::SUBVALUES | {white, black, grey} |
| END.DEFINE | |

Although the SUBVALUES slot is the only required slot for defining a legal value hierarchy, a VALUE slot may be included to define a generic value for the hierarchy. This generic value is not a legal value for its hierarchy, but it is a legal value for a hierarchy including its hierarchy as a subvalue. Thus, in the example above, "warm" is a legal value for "colors" but "warm" is not a legal value for "warm.colors".

In addition to simplifying the knowledge engineer's task of specifying legal values for attributes, legal value hierarchies are taken into consideration in the process of concluding values for corresponding single-valued attributes. If, for example, a rule is applied which concludes that the value of the single-valued "paint.color" is "warm" with a definite certainty factor of <1.0>, the competing legal values "cool" and "neutral" are known to be false and are assigned certainty factors of <−1.0>. Also, all of the decendants of "cool" and "neutral" are similarly known to be false. Thus, the values "green", "blue", "purple", "white", "black", and "grey" are all assigned certainty factors of <−1.0>.

In general, the legal value hierarchy specifies paths for the propagation of certainty factors and eliminates the need for judgemental rules to control the propagation process between levels in the hierarchy. The propagation process is inherently defined. A value concluded with an "unknown" certainty factor between the positive and negative threshold limits, for example <+0.2> and <−0.2>, is never propagated. A value concluded with the highest certainty factor more positive than the positive threshold has its certainty factor propagated upwardly to ancestor values. A value concluded with a certainty factor more negative than the negative threshold has its certainty factor propagated downwardly to offspring values. It is also advantageous to propagate negative certainty factors upwardly in some circumstances. If all offspring have certainty factors more negative than the negative threshold, then the least negative should be combined with an unknown or positive certainty factor of the parent value. Also, if a parent value has a positive certainty factor of at least the definite threshold, <1.0>, and all but a single remaining offspring have certainty factors at least as negative as the negative elimination threshold <−1.0>, then that remaining offspring can be definitely concluded to be true and can be assigned a positive definite certainty factor.

The knowledge base objects of CLASS, CLASS.-TYPE, ATTRIBUTE, VALUE.HIERARCHY, RULE and CONTROL.BLOCK have been introduced and described as a means for organizing the knowledge base so that it is transparent, explainable, and is easy to maintain and incrementally modify by adding, deleting, or modify existing objects. If is important that the knowledge engineer does not modify or "subvert" the inherent structure and organization to suit particular applications or specific needs. Such subversion could prevent the knowledge engineering tool from explaining its actions and at most could introduce program bugs.

It does, however, become necessary in many situations to customize the knowledge engineering tool for a particular application domain. For this purpose, the knowledge engineering tool enables the knowledge engineer to define knowledge base objects called "functions" and "external functions." To prevent subversion of the inherent structure and organization of the knowledge engineering tool, a function may simply compute and return a value and cannot invoke a control block, cause instances to be created, cause attributes to be determined, conclude a value for an attribute, or display text to the user. A function is called by using the name of the function in a rule, control block, or function in lieu of an expression of the same type as the TYPE slot in the function definition. The TYPE slot is required and the slot entry may be attribute, text, integer, real, Boolean, value.set, cf, value.cf, or value.cf.set. A function may have arguments listed in the entry of an ARGUMENTS slot in the function definition. The function definition must have a BODY slot including a program for computing the value of the function. The BODY slot either includes an expression of the type in the entry of the TYPE slot which evaluates to the desired function value, or an assignment statement assigning the desired function value to the function name. The function program may include local variable declarations, and block, conditional, iterative and case statements as further described below.

Shown below is an example of a function PYTHAGORAS that calculates the length of the diagonal of a room using the Pythagorean thereom. Also shown is a rule invoking the function PYTHAGORAS and a translation of the rule.

| DEFINE FUNCTION PYTHAGORAS | |
| --- | --- |
| ::TRANSLATION | "sum of the squares of the length and width of" |
| | ! argument.trans(R) |
| ::TYPE | real |
| ::ARGUMENTS | R:ROOM |
| ::BODY | LENGTH[R] * LENGTH[R] + WIDTH[R] * WIDTH[R]; |
| END.DEFINE | |
| DEFINE RULE Rule006 | |
| ::APPLIED.TO | R:ROOM |
| ::PREMISE | LENGTH[R] known and WIDTH[R] known |
| ::CONCLUSION | DIAGONAL[R] = SQRT (PYTHAGORAS(R)) <1.0> |
| END.DEFINE | |
| Translation: | |
| R is a room., | |
| If the length of the room R is known, and the width of the room R is known, | |
| then it is definite <1.0> that the length of the diagonal of the room R is the square root of the sum of the squares of the length and the width of the room R. | |

It should be noted that the knowledge engineering tool generates the translation of the rule by substituting the translation of the function into the translation of the rule. The rule above ensures that the arguments of the function are known before the function is called.

An external function definition is similar to an ordinary function except that the DEFINE statement is as follows:

DEFINE EXTERNAL.FUNCTION [NAME]

Also, the external function definition does not have a body slot. Instead, the knowledge engineer must write the LISP function having a name EXFN.NAME which is linked with the knowledge engineering tool prior to running a consultation.

Now that the organization and syntax of the knowledge base is understood, the procedure for executing control blocks to run a consultation can be further described.

In general, a consultation is run by finding the control block having "TOP.LEVEL" in its "INVOCATION" slot and invoking the control block. Thus, the executive program 60 shown in FIG. 6 for running a consultation merely has two steps, including step 61 finding the top-level control block, and step 62 executing the top-level control block.

Before finding and executing the top-level control block, however, it is more efficient to "internalize" or "compile" the knowledge base into a form more accessible by the consultation driver 25. The user requests compilation of the knowledge base by inputting a "LOAD.KB" command to the user interface (33 in FIG. 2).

The "LOAD.KB" command is one of many top level commands which invoke various functions or utilities of the knowledge engineering tool which help the knowledge engineer design, build, and debug the knowledge base. These utilities include tracing facilities which allow the knowledge engineer to watch the execution of internal events as they occur, test consultation facilities which allow test cases to be saved and rerun, knowledge base access facilities which list the knowledge base or specified portion of it, knowledge base parsing facilities which recognize specific instances of objects in the knowledge base and provide for incremental assembly and consistency checking, debugging facilities which halt a consultation upon the occurrence of a specified event, and recording facilities for generating typescripts of consultations and detailed records of the sequence of internal operations. The commands available to the knowledge engineer to invoke the utilities are listed and described in further detail in Appendix III to the specification.

When the knowledge base (such as in Appendix I) is loaded, it is processed by the knowledge base reader and parser (35 FIG. 2) to generate a set of pointers to specific instances of CLASS, CLASS.TYPE, ATTRIBUTE, CONTROL.BLOCKS, RULE, and FUNCTION objects that are created from the definitions found in the knowledge base file (28 in FIG. 1). These pointers comprise the indexing information 26 in FIG. 1. The knowledge base reader and parser also assemble the indexing information including "internal slots" of object definitions that are redundant but speed up the process of searching the knowledge base. The internal slots include, for example, for each attribute the set of rules which conclude a value for the attribute and the set of attributes which subsume the attribute. The internal slots are further described in Appendix IV to the specification.

The top-level control block is invoked by sequentially executing procedural language statements in the BODY slot of the control block. Each individual statement is terminated by a semicolon. These procedural language statements include statements specifying when instances should be created, what the knowledge system should do after an instance is created, when an attribute should be determined, how an attribute should be determined, what should be done after an attribute is determined, when other control blocks should be invoked, and when text should be displayed to the user. In addition to the explicit control provided by these procedural language statements, the system has built-in control which operates in the absence of or in conjunction with explicit control.

A control block may invoke another control block explicitly by an "invoke" procedural language statement of the following form:

invoke NAME(ARGUMENTS);

NAME is the name of the control block to be invoked, and ARGUMENTS is a list of arguments passed to the control block. If arguments are passed, the invoked control block must have an ARGUMENTS slot containing declarations of variables to receive the arguments. The variable declarations are separated by commas, and each variable declaration includes a variable name followed by a colon and one of the following: attribute, text, integer, real, Boolean, value.set, cf. value.cf, value.cf.set, and the name of a class or class type. In other words, arguments are passed to an invoked control block in the same fashion as arguments are passed to a function. The explicitly invoked control block cannot be a "top-level" control block or any other kind of implicitly invoked control block.

The invocation process causes the execution of the procedural language statements in the currently invoked control block to be interrupted. Explicit invocation is similar to a subroutine call or a software interrupt. Implicit invocation is similar to an indirect recursive subroutine call or a hardware interrupt in the sense that the interrupting event is outside of the interrupted control block. An implicitly invoked control block is identified by an INVOCATION control block slot having one of the following entries: TOP.LEVEL, POST.INSTANTIATION, DETERMINATION, or POST.DETERMINATION. Otherwise, by default the control block has an INVOCATION entry of INTERNAL and can be invoked only explicitly.

A post-instantiation control block is associated with one or more classes and is implicitly invoked after the creation of an instance of an associated class. In addition to an INVOCATION slot having the entry POST.INSTANTIATION, the control block definition must include an ARGUMENT slot with an instance variable declaration for the associated classes. The associated classes may be specified by one or more class types. Consider, for example, the following post-instantiation control block:

| DEFINE CONTROL.BLOCK | Next.Car |
|---|---|
| ::TRANSLATION | "Gather information about the car" |
| ::INVOCATION | POST.INSTANTIATION |
| ::ARGUMENTS | C:CAR |
| ::BODY | begin; determine symptoms[C]; end; |
| END.DEFINE | |

This control block "Next.Car" will determine the symptoms for any car instance created explicitly or implicitly. By using post-determination control blocks, the knowledge engineer can guarantee that certain attributes will be determined for all existing relevant instances regardless of when and where the instances are created.

A control block having a DETERMINATION entry in its INVOCATION slot is called an "attribute-determination" control block and it is used to specify how the knowledge system should determine an attribute's value. The actions in the BODY slot of the control block indicate the particular methods including QUERY.USER or TRY.RULES that are used to determine the attribute's value and the methods used must be included in the attribute'LEGAL.MEANS slot. The control block must include in its ARGUMENT slot a declaration of an attribute variable for the attribute and instance variable declarations for the classes on which the attribute is defined. A determination control block can be associated with any number of attributes, so long as all of those attributes have identical DEFINED.ON slots.

If an attribute-determination control block is provided for an attribute, the attribute definition should include a DETERMINATION.BLOCK slot including the name of the attribute-determination control block. An attribute, however, cannot have any entry in both a DETERMINATION.MEANS slot and a DETERMINATION.BLOCK slot. In the Car Repair Advisor of Appendix I, for example, the attribute "cause.of.problem" could be determined by the following control block:

| DEFINE CONTROL.BLOCK | Problem.Car |
|---|---|
| ::TRANSLATION | "determine the cause of the ! "problem with the car" |
| ::INVOCATION | DETERMINATION |
| ::ARGUMENTS | A:attribute, C:CAR |
| ::BODY | begin; seek A[C] by rules; end; |
| END.DEFINE | |

Of course, it would be necessary to delete the DETERMINATION.MEANS slot in the definition of the attribute "cause.of.problem" and insert a DETERMINATION.BLOCK slot including the entry "Problem.Car".

The two most common methods of determining the value of an attribute are by using rules and asking the user. These methods are specified by the following procedural language statements in the body of a control block:

| seek | ATTRIBUTE.DESCRIPTOR | by rules |
| seek | ATTRIBUTE.DESCRIPTOR | by asking |

Determination control blocks are especially useful when the determination process requires an alternative method for determining the value for an attribute by applying only certain rules or by asking the user, invoking functions, and applying certain rules in a particular sequence.

One method of applying a predefined subset of rules which conclude values for an attribute is to define a rule category. A category name is selected for the subset. For each rule to be included in the subset or category, a CATEGORY slot is added to the rule definition. The entry of the CATEGORY slot is the set of all category names of the subsets or rule categories including the rule. Overlapping rule categories are permitted sine the CATEGORY slot may include a set of two or more category names. For the Car Repair Advisor, rule categories could be useful to group rules determining groups of related causes, for example, "fuel.rules" for determining whether engine stalling is due to a carburator or fuel line problem, "ignition.rules" for determine whether engine stalling is due to ignition or spark plug failure, "charging.rules" to determine whether stalling is due to improper battery charging, "battery.rules" to determine whether the battery is near the end of its useful life, and "engine.rules" to determine whether the problem is caused by the piston, cylinder, or valve wear or improper valve timing. To diagnose the engine stalling problem, it may be advantageous to apply the rule categories in a particular order so that only one category of rules is applied at any given time. For this purpose, the "seek" statement is qualified by the desired rule category according to:

| | | |
|---|---|---|
| seek | ATTRIBUTE.DESCRIPTOR | by rules whose.category.is CATEGORY.NAME |

In some situations it is desirable to apply only rules with a negative certainty factor. These rules are "exclusionary rules" which rule out suspecting causes so that the excluded causes do not need to be pursued in detail, at least until all other causes have been thoroughly investigated. The relevant exclusionary rules are applied upon execution of the following control block procedural language statement.

rule.out ATTRIBUTE.DESCRIPTION by rules

The rule.out statement may be qualified by a rule category name, in the same fashion as for the "seek" statement described above.

In even more specific circumstances, it may be desirable to apply only rules that explicitly conclude about a particular value. For this purpose, the following control block statements are provided which otherwise function like the respective "seek" and "rule.out" statements above and may be qualified by a rule category name:

| | |
|---|---|
| seek.whether | ATTRIBUTE.DESCRIPTOR = VALUE by rules |
| rule.out.that | ATTRIBUTE.DESCRIPTOR = VALUE by rules |

In general, the knowledge system may need to determine the value of an attribute either to evaluate the premise of a rule being applied or to carry out an action specified by a procedural language statement in the body of a control block. Evaluation of the premise of a rule which requires the value of an attribute not already determined causes goal-directed attribute determination. This is the most general case since the manner in which the attribute is to be determined is not explicitly specified. The following procedural language statement, which may appear in control blocks, also causes a specified attribute to be determined without defining the manner in which the value or values are to be sought:

determine ATTRIBUTE.DESCRIPTOR

Figures 6, 7:
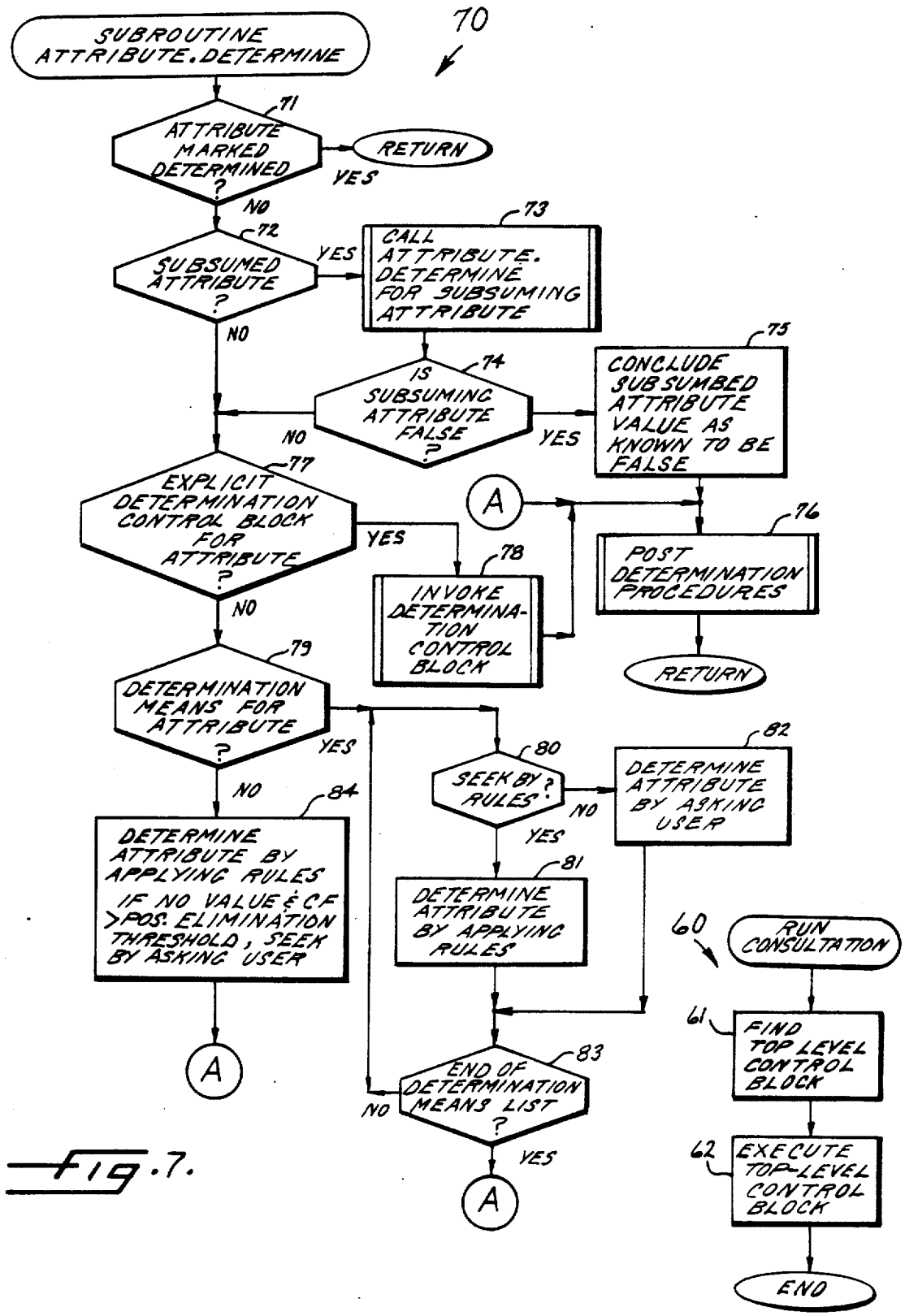
FIG. 6 is a flowchart for the executive program which runs a consultation.
FIG. 7 is a flowchart of an inference engine subroutine for finding the value or values of an attribute.

The attribute determination procedure 70 is illustrated in FIG. 7. In the first step 71, the knowledge system checks whether the attribute has already been marked determined. If so, the values for the attribute have already been determined and are stored in the dynamic data base (27 FIG. 2). Otherwise, in step 72, the SUBSUMED.BY slot of the attribute is checked to determine whether the attribute is a subsumed attribute. If so, then the ATTRIBUTE.DETERMINE subroutine 70 is recursively called in step 73 to determine the value of the subsuming attribute. If the subsuming attribute is false, as tested in step 74, then in step 75 subsumption is applied in the manner previously described to conclude that the value of the subsumed attribute is known to be false and the subsumed attribute is marked determined. In step 76, post-determination procedures are applied, as further described below in conjunction with FIG. 8. Execution then returns to the calling subroutine.

If the attribute definition did not have a SUBSUMED.BY slot entry, as tested in step 72, then in step 77 the attribute definition is inspected to determine whether there is an entry in a DETERMINATION.BLOCK slot. If so, then in step 78 the determination control block named in the slot entry is invoked to determine the value of the attribute, and execution returns to the calling program after performing the post-determination procedures in step 76. If in step 77, there was no entry in a DETERMINATION.BLOCK slot, then in step 79 the system checks for an entry in a DETERMINATION.MEANS slot for the attribute.

If there is such a slot entry, then the determination means listed in the slot entry are sequentially performed. If any of the determination means is TRY.RULES as tested in step 80, then in step 81 a value is sought for the attribute by trying rules. Otherwise, in step 82 a value for the attribute is sought by asking the user. The end of the list of the determination means is found in step 83, whereupon execution jumps to step 76 to perform the post-determination procedures before returning to the calling program.

If in step 79 a DETERMINATION.MEANS slot entry was not found for the attribute, then in step 84 a value for the attribute is sought by trying rules. If, however, the rules do not determine a value having a certainty factor greater than the positive threshold, (0.2), then a value for the attribute is sought by asking the user. Execution then jumps to step 76 to perform the post-determination procedures before returning to the calling program.

Figure 8:
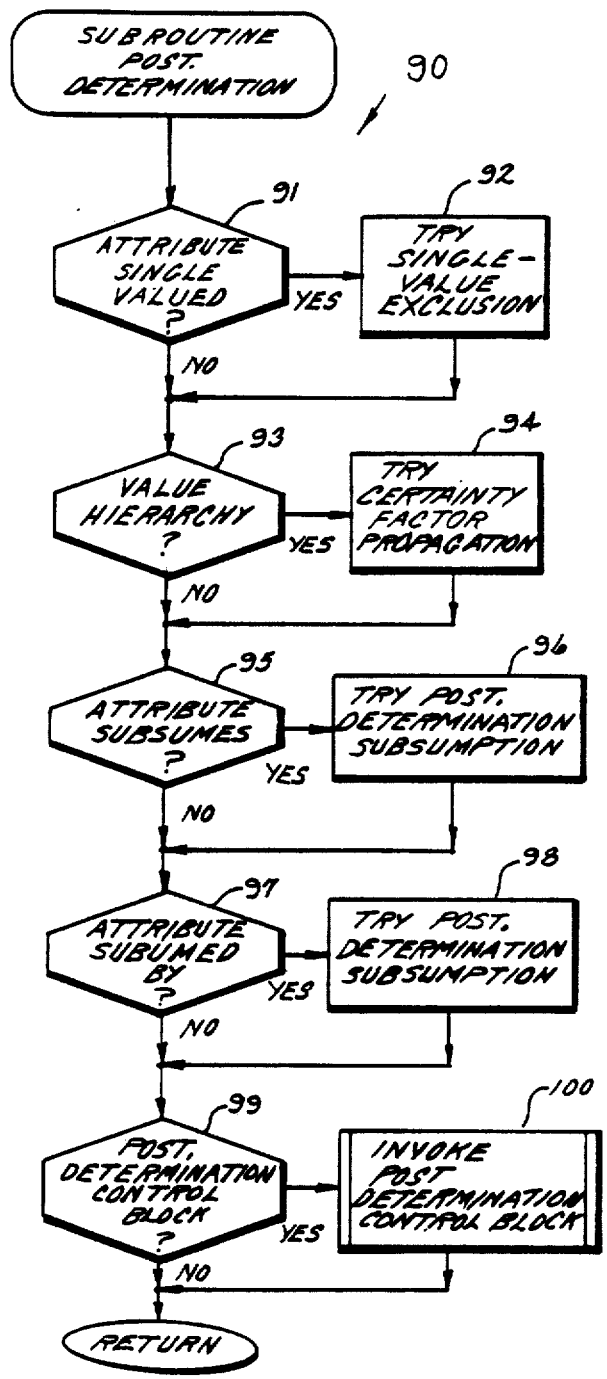
FIG. 8 is a flowchart of an inference engine subroutine executed immediately after the value or values of an attribute have been determined.

The post determination procedures of step 76 are performed by a subroutine generally designated 90 shown in FIG. 8. In the first step 91 the MULTIVALUED slot for the attribute is checked to determine whether the attribute is single valued. If the slot entry is false, the attribute is single valued and in step 92 single-value exclusion is attempted in the manner previously described to eliminate conflicting values. In step 93 the LEGAL.VALUES slot is checked to determine whether it includes the name of the value hierarchy. If so, in step 94 certainty factor propagation is attempted in the fashion previously described. In step 95 the inherent SUBSUMES slot for the attribute is checked to determine whether the attribute subsumes any other attributes. If so, in step 96 post determination subsumption is attempted in the fashion previously described. In step 97 the SUBSUMED.BY slot for the attribute is checked to determine whether the attribute is subsumed by any other attribute. If so, then in step 98 post determination subsumption is attempted, in the fashion previously described. In step 99 the POST.DETERMINE.BLOCK slot for the attribute is checked to determine whether it includes the name of a post-determination control block. If so, in step 100 the post-determination control block is invoked. This completes description of the post-determination subroutine in FIG. 8.

The use of a post-determination control block has not been previously described. It should be noted, however, that it is substantially the same as an attribute-determination control block except that it is invoked after the corresponding attribute has been determined. The post determination control block, for example, also has arguments that include an attribute variable declarations for the attribute and instance varialbe declaration for the classes included in the attribute's DEFINED.ON slot. In general, a post-determination control block is used to perform "forward searching" tasks which immediately use the determined value or values for the attribute.

When a control block is either explicitly or implicitly invoked, control of the consultation temporarily passes to the invoked control block and the system executes the procedural language program in the BODY slot of the control block. It should be noted, however, that during the compiling of the knowledge base by the knowledge base reader and parser (35 FIG. 2) for each statement in the control block a "block statement object" is created in the form of the table of the parsed elements of the statement. Once parsed, the statements are executed by the language interpreter portion (36 in FIG. 2) of the knowledge engineering tool. The language interpreter 36 assumes that the procedural language has a precise syntax or format. The syntax is summarized in Appendix IV to the present specification. In Appendix V, the syntax is defined in terms of primitives that are written in bold italics and arguments that are in small capitals. Optional arguments are enclosed in braces.

The knowledge base language is somewhat similar to the ALGOL computer programming language. The basic components of the knowledge base language are "expressions" and "statements". An expression represents some value of a particular type. When the expression is "evaluated", that value is returned. A statement specifies an action that the consultation system should perform. When the statement is "executed", the consultation system performs that action.

An expression may be a "constant", a "variable", an "attribute descriptor", a "function call", or a number of these joined by operators.

The name of each object in the knowledge base and all variables in the knowledge base language are "identifiers." An identifier is a sequence of letters, digits, periods, and question marks, beginning with a letter.

Each expression has a "data type" that specifies what kind of value the expression can have. The built-in data types include "attribute", "text", "integer", "real", "Boolean", "value.set", "cf", "value.cf", and "value.cf.set". The data types attribute, text, integer, real, and Boolean have already been described. The data type "value.set" specifies that the value of the expression will be a set of values for some attribute. In the knowledge base language the collection of items in a set must be of the same type. A set of type "value.set" has elements of type integer, real, or text. Thus the value of an expression of type "value.set" will be a set of text sequences, a set of integers, or a set of real numbers.

The data type "cf" specifies that the value of an expression will be a certainty factor or real number between +1.0 and −1.0 inclusive.

The data type "value.cf" specifies that the value of the expression will be a pair consisting of a value for some attribute and its corresponding certainty factor.

The data type "value.cf.set" specifies that the value of the expression will be a set of pairs from the dynamic consultation data base that represents the system's conclusions about an attribute of some vector of instances. Each pair in the set consists of a value for the attribute and its corresponding certainty factor. Thus, the value of an expression of type "value.cf.set" is a collection of elements of "value.cf".

In addition to the built-in data types, each class and class type in the knowledge base defines a data type, and the value of an expression of this type is an instance of the class or class type. Note that there can be no constants or attribute descriptors of any of these data types, only variables and function calls.

The knowledge base language is similar to conventional programming languages in that it permits the use of constants for each built-in data type. Hence, there are attribute constants, text constants, arithmetic constants, Boolean constants, constant value sets, constant certainty factors, constant value-certainty factors pairs, and constant value-certainty factor sets. In particular, a constant of type "attribute" is simply the name of an attribute in the knowledge base. There are only two Boolean constants, consisting of "true" and "false". A "constant value set" is a collection of values of the same data type enclosed between left and right braces and separated by commas. A "constant certainty factor" is a real number between −1.0 and 1.0 inclusive. When a certainty factor is used in conjunction with a value, it is enclosed between "<" and ">". A "constant value-certainty factor pair" is a text, integer, real, or Boolean value followed by a certainty factor enclosed between "<" and ">". Constant value-constant certainty factor pairs are use to define "constant value-certainty factor sets". A constant value-certainty factor set is a collection of value-certainty factor pairs enclosed between braces and separated by commas.

Figure 11:
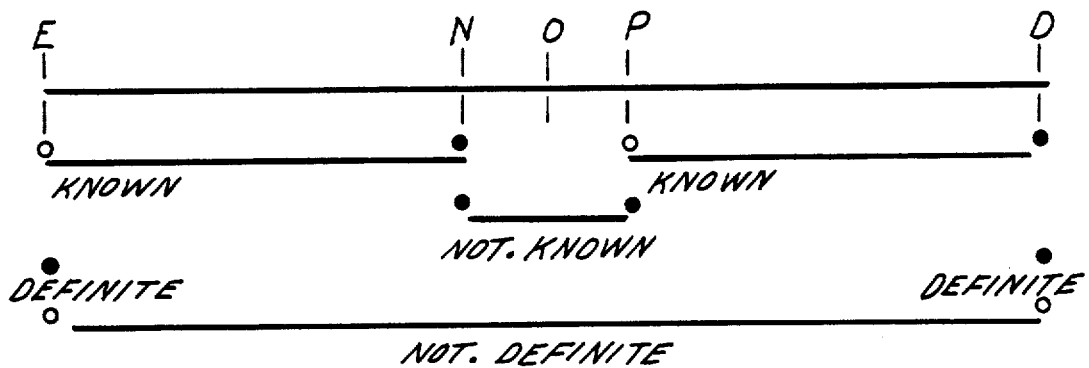
FIG. 11 is a diagram illustrating the meaning of several value-independent predicates for Boolean attributes with respect to the certainty factor for the value.

A constant value-certainty factor set may be used only in INITIAL.VALUES and DEFAULT.VALUES slots of attributes. At the start of the consultation, an attribute becomes set to the initial values. If an attribute is determined but no values are "known" after determination process, then the attribute assumes the default values. Values are "known" when their associated certainty factors exceed the positive threshold for non-Boolean attributes, or are not between the negative and positive thresholds for Boolean attributes, as shown in FIGS. 10 and 11, respectively, which are further described below.

The knowledge base language provides for "variables" which are identifiers that can be assigned values. A variable must be declared, indicating the type of value that the variable can have before the variable is used. Variables may be declared for built-in types and also for instances of classes. To declare a variable for a built-in type, the variable is followed by a colon and the desired type. The following are typical examples:

| NUMBER: | real |
|---|---|
| FEATURE: | attribute |

All of the variables that are used in rules and many of the variables that are used in control blocks are "instance variables" having values that are particular instances of classes. The instance variables are declared on particular classes by a statement including the name of the variable followed by a colon and the name of the particular class, for example, "C1:CAR". Variables can also be declared on class types in which case the variable can be bound to an instance of any class in the CLASSES slot of the particular class type. Particular restrictions may be specified for instance variable declarations by appending a "|" followed by a Boolean expression to the variable declaration. The instance variable is declared only for instances which make the Boolean expression true. Consider, for example, the following restricted instance variable declaration:

(C:CAR | SYMPTOMS[C] = car.stalled.while.driving)

This restricted instance variable declaration insures that C is bound to only instances of CAR that have the particular symptom that the car stalled while driving.

Variables can be used only within a particular part of the program including the declaration of the variable. Thus, the variables are local to a particular region of the knowledge base, which is called the "scope" of the variable. The BODY slot of a control block, for example, is made up of a set of block statements. Each block statement starts with the primitive "begin" and ends with the primitive "end". A variable declared within a particular block statement may be referenced anywhere within that statement, but not outside that statement. A variable declared in the ARGUMENTS slot of a control block or function, may be used only within the program in the BODY slot of the same control block or function. Similarly, a variable declared in the DEFINED.ON slot of an attribute may be used only within text expressions in other slots of the same attribute, and a variable declared in the APPLIED.TO slot of a rule may be used only within the PREMISE and CONCLUSION slots of the same rule.

In addition to constants and variables, the knowledge base language includes attribute descriptors which indicate an attribute and the vector of instances for which the attribute is being accessed. When an attribute descriptor is in an expression, the expression will use the value of the attribute of the vector of instances. If the expression is in the PREMISE slot of a rule and the attibute is not yet determined for that instance vector, the system will determine it according to the goal-directed attribute determination procedure described above. When the expression is in the concluded VALUE in a conclusion statement, or when the expression is used anywhere in a statement, or when the expression is used anywhere in a control block or function, and the attribute has not yet been determined for the instance vector, it will not be determined. The attribute descriptor has the form:

ATTRIBUTE[INSTANCES]

where ATTRIBUTE is the name of an attribute or attribute variable, and INSTANCES in an instance variable or a number of instance variables separated by commas. The instance variables in INSTANCES must be declared to be of classes or class types that match the DEFINED.ON slot of the ATTRIBUTE.

Attribute descriptors are used to specify attributes to be determined and to reference values for the attribute and the vector of instances. When an expression consists of an attribute descriptor, the value of the expression is generally the set of values and certainty factors for the attribute and vector of instances, ordered by decreasing certainty factor. In certain situations, however, the value.cf.set which is the value of the expression will be some subset of all of the pairs of values and certainty factors for the attribute and vector of instances for which the attribute is being accessed. The value of an attribute descriptor is a single attribute value with the highest certainty factor when the attribute descriptor is used as a text expression in a text comparison, as an arithmetic expression, as a selector in a "case" statement (described below), to specify the value in a "seek.whether" or "rule.out.that" statement, or to specify the value to be concluded following an equal sign in a conclusion statement. In some circumstances, however, no value is computed for an attribute descriptor because the attribute descriptor is being used merely to specify the attribute and vector of instances for which a value should be sought or for which a value should be concluded or whether a value has at all been determined.

The knowledge base language includes many primitives that are found in a conventional programming language such as ALGOL. These conventional primitives include function calls, text expressions, arithmetic expressions, Boolean expressions, text comparisons, and Boolean comparisons. The knowledge base language, however, has a few attribute value tests defined especially for knowledge engineering tasks. An attribute value test is a Boolean predicate that tests the value of an attribute to determine whether the attribute has a particular value, is known, or is independent of a particular value. To test whether an attribute has a particular value, the certainty factor is compared to a particular predefined range. The range is defined in terms of an elimination threshold, a negative threshold, a positive threshold, and a definite threshold. These thresholds are, for example, $-1.0$, $-0.2$, $0.2$, and $1.0$ respectively. These predicates include "is", "is.not", "thought.not", "might.be", "value.not.known", "definitely.is", "definitely.not", "not.definitely.is", and "not.definitely.not". The respective certainty factor ranges for each of these predicates are shown in FIG. 9.

Predicates are also provided that test what is known about an attribute of a vector of instances without regard for specific instances. These predicates include "value.not.known", "definitely.is", "definitely.not", "not.definitely.is", and "not.definitely.not". The relationship between these predicates and the certainty factor thresholds are shown in FIGS. 10 and 11 for non-Boolean and Boolean attributes, respectively.

When a number of instances have been created for a class, it is sometimes desirable to determine whether some or all of the instances satisfy a particular condition. For this purpose, the knowledge base language includes quantified conditions containing instance variable declarations and conditions to be tested for these variables. The quantified condition is either true or false depending on whether the condition succeeds for the specified set of instances. The quantified condition is in the form of a quantifier followed by an instance variable declaration followed by a Boolean expression defining the condition. The knowledge base language provides four different quantifiers. The quantifier "for.all" indicates that the specified condition must be satisfied for all of the instances. When the quantifier "for.all" is used in the PREMISE slot of a rule and all instances of the indicated classes have not been created, they will be created when the rule is tried. When "for.all" is used elsewhere, no new instances will be created. The "for.all" expression returns true if the condition succeeds for all bindings of the instance variable that are declared. All instances variables are local to the "for.all" expression.

The second quantifier is the "for.all.existing" qualifier which is like the "for.all" qualifier except that the condition is tested only for existing instances. In other words, when the quantifier "for.all.existing" is used in a rule, no new instances will be created. In a control block or function, however, "for.all" and "for.all.existing" are identical since in either case the condition is applied only to existing instances.

The third quantifier is the "exists" quatifier which does not have an express condition since the "exists" expression returns true if, after instances are created in a rule, the instance variable has instances for each class or class type in the instance declaration.

The fourth quantifier is the "already.existing" qualifier which is like the "exists" quantifier except that instances of each class in the declaration must exist for the instance variable before any instances are created, for example, in a rule. In a control block or function, the quantifiers "exists" and "already.existing" are identical.

In some situations it is desirable to apply rules only to some instances of a class and not to others. To perform this function, the premise of the rule is written in the form of a "try.each" qualifier followed by a restricted variable declaration. When the system tries a rule with a "try.each" expression in its PREMISE slot, it executes the conclusion statement or statements in the rule's CONCLUSION slot for each binding of the variable or variables that satisfy the specified restriction. The certainty of the restriction for a given binding modifies the conclusion that is made for that binding.

The importance of expressions is that they are used in statements in the knowledge base which cause the knowledge system to perform an action which changes either the consultation flow or creates instances of classes or changes the value or values or certainty factors for attributes. Statements are classified into three types according to their function.

Conclusion statements make assertions into the dynamic data base (27 FIG. 1) and thereby change the value or certainty factors for attributes and the instances of the classes on which the attributes are defined. Conclusion statements may be used only in the CONCLUSION slot of a rule and in a "create.instance" statement after the qualifier "with".

Assignment statements assign values to variables and may be used only in the BODY slot of a function. It is especially important that assignment statements are not permitted in the BODY slot of control blocks. The imperative procedural language specifying the control or flow of the consultation is then an "applicative" language that can always be traced and explanations of how and why the consultation subsystem arrived at particular conclusions can always be generated.

Control block statements affect the control of a consultation and may be used only in the BODY slot of a control block. These control block statements include the "create.instance" and "create.all.instances" statements to create specified instances of a class, the "determime" statement to determine the value or values for an attribute, the "seek", "rule.out", "seek.whether", and "rule.out.that" statement, which all conclude values for an indicated attribute using indicated rules; the "display" statement which is used to display text, including the results of a consultation; and the "invoke" statement used to invoke a control block.

Statements may be combined in a number of ways to form compound statements. These compounds statements include "block" statements, "iterative" statements, "conditional" statements, and "case" statements.

The most elementary compound statement is a block statement consisting of a collection of statements interposed between a "begin" primitive and "end" primitive. Block statements in control blocks may include after the "begin" primitive a string of variable declarations prefixed by the primitive "vars" and separated by commas. When variable declarations are included, the variables are bound according to the declarations and the following statements are sequentially executed.

An iterative statement is a compound statement including statements that are repetitively executed. An iterative statement is in one of four forms. The first form begins with the primitive "while" and is in the following format:

while CONDITION do STATEMENT

This "while" statement evaluates the conclusion, and if the conclusion succeeds, the statement is executed. The condition is re-evaluated and the statement re-executed an indefinite number of times until the condition fails.

The iterative statement may be in the form of a "repeat" statement according to the following format:
repeat STATEMENT until CONDITION
When the "repeat" statement is executed, the STATEMENT is executed, the CONDITION is evaluated, and if the CONDITION fails, the process is repeated indefinitely until the condition succeeds.

The third form of iterative statement is a "for.each" statement which qualifies a statement or iterative statement to be performed for a specified subset of instances. To perform a statement for a specified subset of class instances, one of the following iterative statements is used:

```
for.each INSTANCE.VARIABLE.DECLARATION
do STATEMENT
for.each INSTANCE.VARIABLE.DECLARATION
until CONDITION do STATEMENT
for.each INSTANCE.VARIABLE.DECLARATION
while CONDITION do STATEMENT
```

In the above, the INSTANCE.VARIABLE.DECLARATION is a single instance variable declaration, a number of instance variable declarations separated by commas, or a restricted instance variable declaration. For each binding of the variable or variables that satisfies the declaration, the STATEMENT is executed, subject to a "while" or an "until" constraint.

If "while" is specified, the CONDITION is tested for each setting of the variable or variables, and if the CONDITION succeeds, the STATEMENT is executed. Otherwise, the iterative statement terminates and no other setting of the variable or variables are tried.

If the constraint "until" is specified, the CONDITION is tested for each setting of the variable or variables, and if the condition fails, the STATEMENT is executed. Otherwise, the iterative statement terminates and no other settings of the variable or variables are tried.

In order to perform a statement for a specified set of non-instance variables, one of the following iterative statements is used:

```
for.each DECLARATION in SET do STATEMENT
for.each DECLARATION in SET until CONDITION
   do STATEMENT
for.each DECLARATION in SET while CONDITION
   do STATEMENT
```

In the above, DECLARATION is a single non-instance variable declaration. The type of the variable in this declaration must be text, integer, real, or value.cf. The variable is bound in turn to each element of the SET and the STATEMENT is executed. The type of elements in the SET must be the same as the type of variable in the DECLARATION. Execution of the STATEMENT can be restricted by the qualifiers "while" and "until".

If the qualifier "while" is specified, the CONDITION is tested for each setting of the variable and if the CONDITION succeeds, the STATEMENT is executed. Otherwise, the iterative statement terminates and no other settings of the variable are tried.

If the qualifier "until" is specified, the CONDITION is tested for each setting of the variable, and if the CONDITION fails, the STATEMENT is executed. Otherwise, the iterative statement terminates and no other settings of the variable are tried.

The final iterative statement provided by the knowledge base language is a "for" statement in one of two forms:

```
for IDENTIFIER from BEGIN to END
   do STATEMENT
for IDENTIFIER from BEGIN to END
   by STEP do STATEMENT
```

BEGIN, END, and STEP are all arithmetic expressions and they are evaluated once when execution of the iterative statement begins. IDENTIFIER is used as a variable of type integer. IDENTIFIER is set to the value of BEGIN and the STATEMENT is executed. Then IDENTIFIER is incremented by STEP, or by one when "by STEP" is not specified. So long as IDENTIFIER is less than or equal to the value of END, the process starting with the execution of STATEMENT is repeated.

Another compound statement provided by the knowledge base language is a conditional statement in the form of:

if CONDITION then STATEMENT1 [else STATEMENT2]

Upon execution of this conditional statement, the CONDITION is evaluated, and if it succeeds, then STATEMENT1 is executed. Otherwise, if "else" is specified, STATEMENT2 is executed.

The final compound statement provided by the knowledge base language is the "case" statement in the following format:

```
case SELECTOR of
LABEL1 : STATEMENT1
  . . .
LABELN : STATEMENT N
{otherwise STATEMENTX} end
```

SELECTOR is a text expression, an arithmetic expression, or an attribute expression. If SELECTOR is a text expression, each LABEL is a text constant, or a number of test constants separated by commas. If SELECTOR is an arithmetic expression, each LABEL is an arithmetic constant or a number of arithmetic constants separated by commas. If SELECTOR is an attribute expression, each LABEL is an attribute constant, or a number of attribute constants separated by commas. The expression SELECTOR is evaluated, and if its value is equal to one of the constants in a particular label, the corresponding STATEMENT is executed. If not, and "otherwise STATEMENTX" is specified, STATEMENTX is executed.

The knowledge base language also includes several built-in functions for manipulating expressions, accessing the knowledge base (23 FIG. 1) and the dynamic data base (27 FIG. 1), and manipulating text. These functions are shown at the end of Appendix V to the present specification.

Now that the interpretation and syntax of the knowledge base language have been described, the strategy and advantage of the knowledge base language should be apparent upon inspection of a few control blocks. Consider first a top-level control block for a knowledge system that gathers information about a house and advises its user whether the house is a good buy:

```
DEFINE CONTROL.BLOCK    Adivse.House
::TRANSLATION      "give advice about buying a house"
::INVOCATION       TOP.LEVEL
::BODY             begin
                   vars H:HOUSE;
                   create.instance HOUSE called H;
                   seek address[H] by asking;
                   invoke Find.Structure[H];
                   determine desirability[H];
                   determine good.buy[H];
                   invoke Display.Analysis[H];
                   end;
END.DEFINE
```

This knowledge system begins a consultation by creating a HOUSE instance and querying the user for its street address and asking price.

Assuming that the LEGAL.MEANS slot of the attribute "address" is "query.user", in this case it is unnecessary for "address" to have either a DETERMINATION.MEANS or a DETERMINATION.BLOCK slot. Since QUERY.USER is the only legal method for determining "address", however, the control block would be clearer if it used the statement:

```
determine address[H];
instead of:
seek address[H] by asking;
```

In contrast, suppose that the LEGAL.MEANS slot of the attribute "asking.price" is {QUERY.USER, TRY.RULES} and its DETERMINATION.MEANS slot is {TRY.RULES} "asking.price" will be marked "determined" only if the user enters a definite answer. If the user does not know the asking price, or is unsure of it, the system may later determine "asking.price" by trying rules that conclude what might be a reasonable price for the house. Note that these rules will not be tried until some other control block is invoked that executes one of the following statements:

determine asking.price[H];
or:
seek asking.price[H] by rules;

After its preliminary queries (about "address" and "asking.price"), the system invokes a control block Find.Structure, passing as an argument the house instance that was just created:

| DEFINE CONTROL.BLOCK | Find.Structure |
|---|---|
| ::TRANSLATION | "find out the layout of the rooms" <br> ! " on the floors of" <br> ! argument.trans(H) |
| ::INVOCATION | INTERNAL |
| ::ARGUMENTS | H:HOUSE |
| ::BODY | begin <br> create.all.instances FLOOR; <br> for.each F:FLOOR do <br> create.all.instances ROOM <br> whose.parent:is F; <br> end; |
| END.DEFINE | |

The control block Find.Structure will cause the system to create all instances of all classes in the class type FLOOR, and to create all ROOM instances on each FLOOR instance.

Once the system has established the layout of the house, it determines values for the attributes "desirability" and "good.buy", then invokes the control block "Display.Analysis" (with the house instance as its argument) to show the user its recommendations.

Instead of using an internal control block to determine the number of rooms on a floor, there could be defined a post-instantiation control block invoked each time a particular floor of the house is first considered. This would be preferred if a floor instance could be created by goal-directed instantiations. A typical post-instantiation control block is shown below:

| DEFINE CONTROL.BLOCK | About.Floor |
|---|---|
| ::TRANSLATION | "Gather information about the floor" |
| ::INVOCATION | POST.INSTANTIATION |
| ::ARGUMENTS | F:FLOOR |
| ::BODY | begin <br> determine number.rooms[F]; <br> I from 1 to number.rooms do <br> create.all.instances <br> GENERAL.PURPOSE.ROOM <br> whose.parent.is F; <br> create.all.instances BEDROOM <br> whose.parent.is F; <br> end; |
| END.DEFINE | |

The following post-determination control block is useful for determining the size and shape of a room immediately after the ceiling height of a room is determined:

| DEFINE CONTROL.BLOCK | Get Shape |
|---|---|
| ::TRANSLATION | " consider the implications of" <br> ! " determining the ceiling height" <br> !" of the room" |
| ::INVOCATION | POST.DETERMINATION |
| ::ARGUMENTS | A:attribute, R:ROOM |
| ::BODY | begin <br> if ceiling.height[R] known then <br> begin |

-continued

| DEFINE CONTROL.BLOCK | Get Shape |
|---|---|
| | determine size[R]; <br> determine shape[R]; <br> end <br> else display "It is impossible to" <br> ! " determine the size and shape of" <br> ! instance.trans(R)! " " <br> end; |
| END.DEFINE | |

Selective application of rules is illustrated by the following determination control block which determines the characteristics of a house:

| ::TRANSLATION | "determine the characteristics of" <br> ! " the house" |
|---|---|
| ::INVOCATION | DETERMINATION |
| ::ARGUMENTS | A:attribute, H:HOUSE |
| ::BODY | begin <br> rule.out.that classification[H] = <br> old by rules; <br> rule.out.that classification[H] = <br> large by rules <br> whose.category.is SMALL; <br> seek.whether classification[H] = <br> good.shape by rules; <br> if classification[H] might.be old <br> then <br> seek.whether classification[H] = <br> old by rules; <br> if classification[H] value.not.known <br> large then <br> seek classification[H] by rules <br> whose.category.is MAYBE.LARGE <br> if classification [H] not known then <br> begin <br> rule.out classification[H] by rules <br> whose.category.is LAST.HOPE; <br> rule out classification[H] by rules; <br> seek classification[H] by rules <br> whose.category.is LAST.HOPE; <br> seek classification[H] by rules; <br> end; <br> end; |
| END.DEFINE | |

The use of the display statement is illustrated by the following internal control block which summarizes information about the house:

| DEFINE CONTROL.BLOCK | Display.Analysis |
|---|---|
| ::TRANSLATION | "Summarize information about the" <br> " house" |
| ::INVOCATION | INTERNAL |
| ::ARGUMENTS | H:HOUSE |
| ::BODY | begin <br> for.each F:MAIN.FLOOR do <br> begin display(NEW.LINE() <br> ! "Summary for" <br> ! instance.trans(F) ! "a main" <br> ! " floor" <br> ! INDENT()); <br> for.each (R:ROOM \| (on floor [F,R])) <br> do <br> display(NEW.LINE() ! "For" <br> ! instance.trans(R) <br> ! ", dimensions = " <br> ! length[R] ! " × " ! width[R] <br> ! " × " ! ceiling.height[R] <br> ! NEW.LINE() ! INDENT() <br> ! "size = " ! size[R] <br> ! ", shape = " ! shape[R] <br> ! ", color = " ! color[R] <br> ! OUTDENT()); <br> display(OUTDENT()) end; <br> for.each F:NON.MAIN.FLOOR do |

-continued

DEFINE CONTROL.BLOCK   Display.Analysis

```
        begin display(NEW.LINE()
        ! "Summary for"
        ! instance.trans(F)
        ! ", a floor with"
        ! number rooms[F]
        ! " rooms:" ! INDENT());
        for.each (R:ROOM | on floor[F,R]) do
        display(NEW.LINE() ! "For"
        ! instance.trans(R)
        ! ", dimensions = "
        ! length[R] ! " × " ! width[R]
        ! " × " ! ceiling height[R]
        ! NEW.LINE() ! INDENT()
        ! "size = " ! size[R]
        ! ",shape = " ! shape[R]
        ! ",color = " ! color[R]
        ! OUTDENT());
        display (OUTDENT()) end;
        display (NEW.LINE() ! NEW.LINE()
        ! "The color of the house is"
        ! exterior paint[H] ! "" ! NEW.LINE()
        ! The classification of the"
        ! " house is"
        ! classification[H] ! "" ! NEW.LINE()
        ! "The suggested price is"
        ! suggested price[H] ! "" !
        NEW.LINE());
        for.each F1:FLOOR do
        for.each F2:FLOOR do
        for.each F3:FLOOR do
        determine TWO.OF.THREE[F1, F2, F3];
        end;
```

END.DEFINE

A domain-independent knowledge engineering tool has been described for use by knowledge engineers to build and interpret a domain-dependent knowledge base having separate portions encoding control knowledge, factual knowledge, and judgmental rules. The tool has an inference engine applying the judgmental rules according to a built-in control procedure defining a consultation with a user. The control knowledge is encoded in an applicative and imperative language defining control actions to be executed during interruption of the built-in control procedure at specified control steps. Since the control knowledge is explicit and results in the modification of data only in a precisely defined fashion, the tool can be used to build knowledge systems that can always explain their conclusions and reasoning, and that are intelligible and modifiable.

Although the knowledge engineering tool described above uses a goal-directed or backward-chaining inference engine and has a user interface (33 FIG. 2) and core (37) based on the well-known EMYCIN tool, the present invention is advantageously applied to other kinds of knowledge systems. In general, a knowledge system has some kind of judgmental rules which specify actions to be performed when the rules are considered and specified conditions are satisfied. The application of the rules is governed at least in part by a built-in control procedure that is domain-independent. Particular steps or articulation points in the built-in control procedure are selected for interruption of the built-in control so that the application of the rules may also be influenced by control knowledge specifying domain-dependent control procedures.

In the knowledge system described above, the articulation points include when a consultation is started, after an instance of a class is generated, when a value for an attribute is to be determined, and after a value for an attribute is determined. The built-in control procedure could also be interrupted at other points including for example, when a rule is considered, when a rule is applied and its specified action is performed, when a rule is considered but its condition does not exist and its specified action is not performed, when the value of an attribute is examined during the consideration of a value to test whether its condition is satisfied, and at the end of a consultation.

In the knowledge system described above, execution of the built-in control procedure is interrupted at some of the articulation points only when certain conditions are satisfied. After an instance of a class is generated, an interruption occurs only when the instance is of a class having an associated post-instantiation control block. When a value for an attribute is to be determined, an interruption occurs only when the attribute has an associated attribute-determination control block. After a value for an attribute is to be determined, an interruption occurs only when the attribute has an associated post-determination control block. For the alternative articulation points discussed above, it is also desirable to specify respective conditions so that the built-in control procedure is interrupted only when specified rules are considered or specified attributes are determined.

Since the built-in control procedure is either interrupted or must test whether a condition is satisfied at each specified articulation point, it is desirable to permit the knowledge engineer or user to define articulation points and conditions. For this purpose, the knowledge engineer tool may be provided with an editing facility similar to a debugger for permitting the knowledge engineer to add articulation points and associated conditions to the computer program for the built-in control procedure. After the articulation points and associated conditions are added, the computer program for the built-in control procedure is compiled, assembled, or linked with the other portions of the consultation driver (25 FIG. 1) prior to running a consultation.

```
/*                                                        */

LISTING OF

KNOWLEDGE BASE
/*
    This file contains the control block, rule, and attribute definitions
    for the Car Repair Advisor
                                                          */

/* This is the definition of CAR Class              */

DEFINE CLASS    CAR
      ::NUMBER.INSTANCES         1
```

```
        ::ANNOUNCEMENT              new.line() ! indent() !
                                    "This car will be referred to as: " !
                                    instance.name(CAR) ! new.line()
        ::CLASS.TRANSLATION         "a car"
        ::PLURAL.CLASS.TRANSLATION  "the cars"
        ::BLAND.INSTANCE.TRANSLATION "the car"
        ::FULL.INSTANCE.TRANSLATION  "this car"
END.DEFINE
```

```
/*
    Create the class CAR
                                                                           */
        create.instance CAR called C;
/*
    Ask user for symptoms found
                                                                           */
        determine symptoms[C];
/*
    Based on the information, perform tests and determine the cause of problem
                                                                           */
        determine cause.of.problem[C];
/*
    If the cause of problem is not known then display inconclusive results
                                                                           */
        if cause.of.problem[C] not.known
           then
                display "The results are inconclusive." ! new.line()
           else begin
/*
    The cause of problem is known, so now determine what recommendations
    to make.
                                                                           */
                determine recommendations[C];
/*
    Now display the recommendations
                                                                           */
                display
                  capitalize(attribute.value.trans(recommendations[C]));
/*
    And ask user to perform the final system check
                                                                           */
                display new.line() ! new.line() !
                        "Please perform the final system check." !
                        new.line();
              end;
/*
    These "400" rules conclude the cause.of.problem attribute
                                                                           */
/*
    If the fan belt is loose, then we know the problem.
                                                                           */

DEFINE RULE     Rule400
        ::APPLIED.TO    C:CAR
        ::PREMISE       fan.belt.test[C]
```

```
            ::CONCLUSION    cause.of.problem[C] = fan.belt.slipping <1.0>
END.DEFINE /*
   If the fan belt is not loose and is oscilloscope test is fluctuating
   arches and the alternator responds properly to a variable ground,
   then the problem is with the voltage regulator
                                                                          */

DEFINE RULE     Rule408
        ::APPLIED.TO    C:CAR
        ::PREMISE       not fan.belt.test[C]  and
                        oscilloscope.test[C] is fluctuating.arches and
                        loaded.field.terminal.test[C]
        ::CONCLUSION    cause.of.problem[C] = voltage.reg.bad <1.0>
END.DEFINE /*
   This time, the brushes in the alternator are wornout and need
   replacing                                    .
                                                                          */

DEFINE RULE     Rule409
        ::APPLIED.TO    C:CAR
        ::PREMISE       not fan.belt.test[C]  and
                        oscilloscope.test[C] is fluctuating.arches and
                        not loaded.field.terminal.test[C]
        ::CONCLUSION    cause.of.problem[C] = alternator.brushes.wornout <1.0>
END.DEFINE
/*
   These ''900'' rules conclude the recommendations attribute from the
   cause of problem determined earlier
                                                                          */

/*
   The problem is known, so now recommend a course of action to fix the
   problem
                                                                          */

DEFINE RULE     Rule900
        ::APPLIED.TO    C:CAR
        ::PREMISE       cause.of.problem[C] is fan.belt.slipping
        ::CONCLUSION    recommendations[C] = 'The fan belt is loose. To fix ' !
                                'the problem, tighten the pulley holding ' !
                                'the fan belt tightly. '
END.DEFINE DEFINE RULE     Rule902
        ::APPLIED.TO    C:CAR
        ::PREMISE       cause.of.problem[C] is alternator.brushes.wornout
        ::CONCLUSION    recommendations[C] = 'The alternator brushes are ' !
                                'worn out. To fix the problem, please ' !
                                'replace the alternator brushes.'
END.DEFINE DEFINE RULE     Rule903
        ::APPLIED.TO    C:CAR
```

```
            ::PREMISE         cause.of.problem[C] is voltage.reg.bad
            ::CONCLUSION      recommendations[C] = "The voltage regulator is bad. " !
                              "Please replace the voltage regulator. "
END.DEFINE /*
    These are the attribute definitions.
                                                                                    */

/*
    The attriibute to find out symptoms of car from the user
                                                                                    */

DEFINE ATTRIBUTE         symptoms
        ::DEFINED.ON              CAR
        ::TRANSLATION             "the initial symptoms about the car"
        ::TYPE                    Text
        ::MULTIVALUED             true
        ::MULTIVALUED.SEEK.TYPE ALL.VALUES
        ::LEGAL.VALUES            {car.stalled.while.driving}
        ::PROMPT                  "What is wrong with " ! instance.trans(CAR)
                                  ! "? "
        ::LEGAL.MEANS             {QUERY.USER}
        ::DETERMINATION.MEANS     {QUERY.USER}
END.DEFINE DEFINE ATTRIBUTE         cause.of.problem
        ::DEFINED.ON              CAR
        ::TRANSLATION             "the cause of the problem with the car"
        ::TYPE                    Text
        ::LEGAL.VALUES            {fan.belt.slipping,
                                      voltage.reg.bad,
                                      alternator.brushes.wornout}
        ::LEGAL.MEANS             {TRY.RULES}
        ::DETERMINATION.MEANS     {TRY.RULES}
END.DEFINE DEFINE ATTRIBUTE         recommendations
        ::DEFINED.ON              CAR
        ::TRANSLATION             "the recommendation made to fix the problem" !
                                  verb(" is", "") ! ":" ! new.line()
        ::TYPE                    Text
        ::LEGAL.MEANS             {TRY.RULES}
        ::DETERMINATION.MEANS     {TRY.RULES}
END.DEFINE DEFINE ATTRIBUTE         fan.belt.test
        ::DEFINED.ON              CAR
        ::TRANSLATION             "the fan belt " ! verb("is","is not") !
                                  " loose"
        ::TYPE                    Boolean
        ::PROMPT                  "Try rotating the pulley attached to the " !
                                  "alternator. Does it rotate? "
        ::LEGAL.MEANS             {QUERY.USER}
        ::DETERMINATION.MEANS     {QUERY.USER}
END.DEFINE
```

```
DEFINE ATTRIBUTE           loaded.field.terminal.test
        ::DEFINED.ON            CAR
        ::TRANSLATION           "the alternator " !
                                    verb("responds", "does not respond") !
                                    "properly to a variable ground " !
                                    "on the ground field terminal"
        ::TYPE                  Boolean
        ::PROMPT                "Break the connection between the voltage " !
                                    "regulator and the ground field terminal. " !
                                    "Hook a variable resistor between the ground" !
                                    " field terminal and the negative battery " !
                                    "post. Turn on the ignition, look at the " !
                                    "oscilloscope, and vary the resistor. Does " !
                                    "the oscilloscope pattern vary linearly " !
                                    "as the resistance changes? "
        ::LEGAL.MEANS           {QUERY.USER}
        ::DETERMINATION.MEANS   {QUERY.USER}
END.DEFINE DEFINE ATTRIBUTE           oscilloscope.test
        ::DEFINED.ON            CAR
        ::TRANSLATION           "the oscilloscope " !
                                    verb("shows", "does not show")
        ::TYPE                  Text
        ::LEGAL.VALUES          {fluctuating.arches}
        ::PROMPT                "Please perform the oscilloscope test. " !
                                    "What type of pattern do you see? "
        ::LEGAL.MEANS           {QUERY.USER}
        ::DETERMINATION.MEANS   {QUERY.USER}
END.DEFINE
```

APPENDIX II

TYPESCRIPT OF "CAR REPAIR ADVISOR

CONSULTATION

-> START.CONSULTATION   INTERACTIVELY

This case will be Case 6.
       Welcome to the Car Repair Advisor.

This car will be referred to as:  car #1

1:  What is wrong with this car?
1> CAR.STALLED.WHILE.DRIVING

2:  Try rotating the pulley attached to the alternator.
    Does it rotate?
2> NO 3:  Please perform the oscilloscope test.
    What type of pattern do you see?
3> FLUCTUATING.ARCHES 4:  Break the connection between the voltage regulator
    and the ground field terminal. Hook a variable
    resistor between the ground field terminal and the

```
negative battery post.  Turn on the ignition, look
at the oscilloscope, and vary the resistor.
Does the oscilloscope pattern vary linearly as the
resistance changes?
4> NO It is definite that the recommendation made to
        fix the problem is:

The alternator brushes are worn out.  To fix
    the problem, please replace the alternator brushes.  <1.0>

Please perform the final system check.
=>
```

APPENDIX III

COMMANDS RECOGNIZED BY THE USER INTERFACE FOR INVOKING KNOWLEDGE ENGINEERING TOOL FACILITIES

GENERAL COMMANDS load.kb FileName {quiet}
 Load a knowledge-base file. (The default extension is kb.) If you type a keyboard break while a knowledge-base file is being loaded, loading is interrupted and you can enter commands. Loading can be resumed via the continue.load.kb command. To abort loading, issue the abort.load.kb command.
 While loading a knowledge base file, progress-report messages are printed on the terminal. To inhibit printing of these messages, the word quiet can be included in the command. Specifying quiet does not suppress warning or error messages.
 The load.kb command is not allowed while loading a knowledge-base file. You must either wait for the knowledge-base file to finish loading or abort the load by issuing the abort.load.kb command. The load.kb command is allowed only during the preparation phase. (The abort.consultation command puts you in that phase.)

continue.load.kb {quiet}
 This command is legal only after you have interrupted the loading of a knowledge base file by issuing a break. continue.load.kb resumes loading the knowledge base.
 If quiet is specified, progress-reports are suppressed; otherwise, they are printed on the terminal.

abort.load.kb
 This command aborts the process of loading a knowledge-base file. Like continue.load.kb, it can be issued only while a load.kb command is still in effect.

clear.kb
 Erase the knowledge-base currently loaded. The current knowledge base vanishes from memory.
 This command is illegal while a knowledge-base file is being loaded. It is also illegal during a consultation, or after a consultation has completed normally. clear.kb is only legal before the first consultation or after an abort.consultation and as long as no knowledge-base file is being loaded. (This state can be reached by issuing an abort.consultation command.)

load.lisp FileName
 A LISP file (source of compiled) is loaded. The default extension for the lisp file is XFN.

check.kb
 The names of any knowledge-base files that have been loaded are indicated, and it is nothing whether the knowledge base is consistent. (If it is not consistent, consultations cannot be run.) Included in this report are the names of any knowledge-base functions declared as "external" for which no corresponding Lips function has been defined.

start.consultation {integer|(file FileName}
 {interactively|automatically|checked}
 Start a (new) consultation. If a consultation is already in progress, you will be asked to confirm that you want to abort the consultation in progress. If you confirm, or if no consultation was in progress, a new consultation begins.
 A previously-run case can be used as the source for queries, by specifying either the case number (for a case run during this session) or the file on which the case was stored, (via the save.case command).
 The consultation mode directs what should happen when the system generates queries. In interactive mode, you are always given the opportunity to respond, even if there is an answer from an input case. In automatic mode you are never given a chance to respond; any query which has no answer from an input case is answered 'unknown' if it is for an attribute value and 'no' if it is for instance creation. In checking mode (which is allowed only when there is an input case), any answer found in the input case is taken automatically, but any query without an answer is posed to you interactively.
 This command is not allowed while the system is loading a knowledge-base file (while the load.kb command has been interrupted or if the knowledge base is empty or inconsistent.)

continue.consultation {interactively|automatically| checked}
 Continue the current consultation. This resumes a consultation that has been suspended by an internal break or by the user typing the <break> key).
 If no mode is specified, the mode most recently specified in a start.consultation or continue.consultation command is used.
 This command is allowed only while a consultation is in progress. Note that any time at most one of continue.consultation and continue.load.kb is legal, so continue is unambiguous.

save.case CaseNumber FileName
 The answers to queries given by a user during a consultation are remembered and collectively called a case. The cases created during any execution of the system are numbered sequentially. This command saves a case on a disk file, for subsequent use as the input to a new consultation.

abort.consultation

This stops the current consultation (if any) and discards all associated information about it (the dymanic database and event history). Thus, after this command has executed, no explanations or probes are available.

This command is allowed only while a consultation is in progress and not while a knowledge-base load is in progress.

typescript.file {show|close|(open FileName)}

A typescript is a record the system makes of (most) terminal interactions.

typescript show gives the name of the currently-open script file, or indicates that there is none.

typescript close closes any open script file and indicates its name.

typescript open opens a new script file. First a close is done if there is an open typescript file. Then a new script file is open, using that name. The default extension is TS.

comment AnyTextForTheRestOfTheLine

This command allows anything to be typed in an ignored. (The purpose is to allow the user to insert a line of commentary into the typescript file.)

begin trace.events EventType

If one or more EventTypes is specified, enable tracing for them. Subsequently, whenever an event occurs of a type for which tracing is enabled, a message is printed on the terminal, indicating the event number, the type of event, and details appropriate to the type. Event types include the following:

instance.creation
—an instance of some class is created.
attribute.conclusion
—some conclusion is made about in attribute.
rule.application
—an attempt is made to apply a rule.
rule.failure
attribute.seek
—an attempt is made to seek the value of an attribute.
instance.attempt.creation
attribute.determination.initiation
attribute.determination
—an attribute's determination is complete.
rule.success
—a rule is successfully applied.
control.block.invocation
control.block.exit
all
(This level adds events likely to be useful for very low-level debugging.)
answer.to.system—the user's answer to a query.
explanation.probe—the user asks for (and receives) an explanation about the dynamic behavior of the consultation. The events query.from.system are recorded, but they cannot be traced or broken.

break.events EventType

If one or more EventType are specified, enable breaking for them. Subsequently, whenever an event occurs of a type for which breaking is enabled, a message is printed (similar to that for tracing). Then, consultation execution is suspended and the user can interact with the system in command mode. The user can get execution to resume by issuing the continue.consultation command.

If both breaking and tracing are enabled for a particular event type, the break occurs but the tracing message is not printed.

untrace.events EventType

Disable tracing for each of the indicated event types for which it is currently enabled. (This does not affect the status of "breaking" for the event type.)

unbreak.events EventType

Disable breaking for each of the indicated event types for which it is currently enabled. (This does not affect the status of "tracing" for the event type.)

lisp

The user is dropped into the underlying Lisp. (The standard Lisp interface is then used.) You exit from lisp by typing OK. The OK must be in uppercase.

exit

Return control to the machine's operating system. If a consultation was in progress, when you resume it, by calling the function TOPLEVEL, execution continues in the post-consultation or analysis phase—the consultation can not be continued. Any open typescript files are closed.

This command is not allowed if a knowledge-base load is in progress. (It must first be completed or explicitly aborted.)

create.program FileName

Create a "sysout": an executable "core image" of the application system (includes the entire knowledge base if one has been loaded). The default extension is .PGM. This command is not legal while a knowledge base file is being loaded.

disable (hacking|probing) PassWord PassWord

After issuing this command, certain other commands are disabled from further use in the current "core image", as follows:

disable hacking—This disables define, lisp, create.program, load.kb, load.lisp, trace, and break. This should also disable control H or other entry to Lisp.

disable probing—This disables explain.consultation, what, why, how, show, and examine.kb.

The user also chooses and types in a password; this becomes the key if the user later wants to re-enable this facility. The password can be any identifier token, number, or string (in double quotes). The password is not echoed on the terminal (or in the typescript file). The user must type the password twice, identically, to ensure that he or she knows what the key is; if the two versions do not match, the command is aborted.

If the selected facility (hacking and probing) is already disabled, this command is illegal (and, in particular, does not change the stored password associated with the facility).

enable (hacking|probing) PassWord

If the PassWord matches the one that was typed, in with the previous corresponding disable command, the facility is re-enabled. The PassWord is not echoed on the terminal or written into the typescript file.

KNOWLEDGE BASE PROBE COMMANDS examine.kb Object

Displays the definition of specified object, which must be a rule, control block, function, attribute, class, class type, or value hierarchy.

examine.kb ObjectType all

Displays all objects of the given type. ObjectType is one of rule, control.block, function, attribute, class-.or.class.type or value.hierarchy.

examine.kb ObjectType Object

Same as examine.kb Object (This allows the user to request, before typing the Object, to see a menu containing all objects of that type.)

examine.kb attribute ClassOrClassTypeObject

Examine all attributes defined on the specified ClassOrClassTypeObject.

list.kb Filename

This lists the current contents of the knowledge base in the file whose name is given as the argument. The listing includes the internal slots and cross reference information. The main use of list.kb is to get these internal slots and this cross reference information.

EXPLANATION PROBES

These probe for information about events that have occurred during the current consultation. They are valid only during a consultation or directly following a consultation (unless it has been wiped out by ABORT-.CONSULTATION).

In all of the what commands, the user probes for the current values of an attribute descriptor (i.e., an attribute over a vector of instances).

what AttributeDescriptor what EventNumber

Similar to what AttributeDescriptor, except the attribute descriptor used is derived from the specified Event, depending on the type of event, as indicated below. Remember, what is returned is the current value(s), which may be different from the value(s) at the time the event occurred. For some types of events this is meaningless and produced just an error message, as indicated below by "nothing".

instance.creation—nothing.

instance.attempt.creation—nothing.

attribute.determination.initiation—the attribute descriptor being determined.

attribute.seek—the attribute descriptor for which values are being sought.

attribute.consultation—the attribute descriptor being concluded.

attribute.determination—the attribute descriptor determined.

rule.success—nothing.

rule.application—the attributes descriptor(s) to which the rule was applied.

rule.failure—nothing.

control.block.invocation—If the control block is a Determination or Post-determination control block, then the associated attribute descriptor. Otherwise, nothing.

control.block.exit—Same as for control.block.invocation query.from.system—Same as What QueryNumber for that query.

answer.to.system—Same as What QueryNumber for that query.

explanation.probe—nothing.

why EventNumber

"Why was the Attribute descriptor determined?" The answer gives the reason why the knowledge base attempted to determine this attribute. The event types are: explanation.probe—and if the probe was for a why, you can always ask why of a why. query.from.system—Why was the question asked. answer.to.system why.created Class Instance "Why was Instance created?"

how.concluded (AttributeDescriptor|EventNumber)

"How did you conclude Attribute of Instance?" or "How did you conclude that Attribute of Instance was Value?" If the EventNumber form is used, it must refer to an attribute.conclusion event.

APPENDIX IV

INTERNAL SLOTS OF KNOWLEDGE BASE OBJECTS

Internal Slots of Attributes

CONCLUDED.BY

Entry: A set of identifiers, each of which is the name of a rule.

Setting: The set contains the names of all rules whose CONCLUSION slots contain conclusion statements in which a value is concluded for this attribute.

IS.ASSOCIATION

Entry: A Boolean constant.

Setting: true if the name of this attribute is in the ASSOCIATION slot of some class.

SUBSUMES

Entry: A set of identifiers, each of which is the name of another attribute.

Setting: The set contains the names of all attributes that have the name of this attribute in their SUBSUMED.BY slot.

USED.BY

Entry: A set of identifiers, each of which is the name of the rule.

Setting: The set contains the names of all rules that have the name of this attribute in their PREMISE slots.

USED.IN.BLOCKS

Entry: As set of identifiers, each of which is the name of a control block.

Setting: The set contains the names of all control blocks that mention this attribute in their BODY slot.

Internal Slots of Classes

ATTRIBUTES

Entry: A set of identifiers, each of which is the name of an attribute.

Setting: The set contains the names of all attributes whose DEFINED.ON slots have a variable declaration in which the data type is either this class itself or a class type that has this class in its CLASSES slot.

CLASS.TYPES

Entry: A set of identifiers, each of which is the name of a class type.

Setting: The set contains the names of all class types that contain the name of this class in their CLASSES slot.

OFFSPRING.CLASSES

Entry: A set of identifiers, each of which is the name of a class.

Setting: Whenever this class is the data type (Section 1.2) in the first variable declaration (Section 1.4.2) in the DEFINED.ON slot of an attribute, and the name of that attribute appears in the ASSOCIATION slot of another class, that other class will be in the OFFSPRING.CLASSES slot of this class.

QUERY.FOR.INSTANCE
Entry: A Boolean constant (Section 1.3.4)
Setting: true if there is an entry in either the PROMPT.FOR.ONE slot or the PROMPT.FOR.MORE slot of this class, and false if both of these slots are empty.

Internal Slots of Class Types

ATTRIBUTES
Entry: A set (Section 1.3.5) of identifiers, each of which is the name of an attribute.
Setting: The set contains the names of all attributes whose DEFINED.ON slot contains a variable declaration (Section 1.4.2) in which this class type is the data type (Section 1.2).

CLASSES
Entry: A set of identifiers, each of which is the name of a class.
Setting: The set contains the name of all classes that appear in the CONTAINS slot of this class type or in the CLASSES slot of any class type in the CONTAINS slot of this class type.

OFFSPRING.CLASSES
Entry: A set of identifiers, each of which is the name of a class.
Setting: Whenever this class type is the data type in the first variable declaration in the DEFINED.ON slot of an attribute, and the name of that attribute appears in the ASSOCIATION slot of a class, that class will be in the OFFSPRING.CLASSES slot of this class type.

SUPERTYPES
Entry: A set of identifiers, each of which is the name of another class type.
Setting: The set contains all class types that have the name of this class type in their CONTAINS slot.

APPENDIX V

KNOWLEDGE BASE
Language Syntax

1. TaskBlocks

```
TaskBlock ::= taskblock Identifier ({VarDeclStar}) TaskBlockStatement;
    ; note that the Identifier becomes a TaskBlockName
    ; allowable type names for the VarDeclStar includes: integer, real, text,
    boolean, instance, attribute, cf, value.cf, value.set, and value.cf.set TaskBlockName ::= Identifier
```

2. Statements

```
TaskBlockStatement ::= BlockStatement | ComplexStatement |
                      PrimitiveStatement | AssignmentStatement
    ; PrimitiveStatement only allowed in TaskBlocks
    ; AssignmentStatement only allowed in Functions BlockStatement ::= begin {vars TypedVariableDeclStar;} {vars VarDeclStar;}
                     StatementStar {;} end
        ; vars with TypedVariableDeclStar only allowed in TaskBlocks
        ; vars with VarDeclStar only allowed in Functions StatementStar ::= TaskBlockStatement {; StatementStar}

ComplexStatement ::= ConditionalStatement | IterativeStatement | CaseStatement

ConditionalStatement ::= if BooleanExpression then TaskBlockStatement
                      {else TaskBlockStatement}
                      ; Dangling else goes with closest if.
```

```
IterativeStatement ::= WhileStatement | RepeatStatement |
                       ForeachStatement | ForStatement WhileStatement ::= while BooleanExpression do TaskBlockStatement RepeatStatement ::= repeat TaskBlockStatment until BooleanExpression ForeachStatement ::= foreach ForeachVarDecl {in SetExpression}
                     {ForeachTerminationClause} do TaskBlockStatement
   ; in part must be present iff ForeachVarDecl is a SpecialVarDecl
ForeachVarDecl ::= TypedVariableDeclStar | RestrictedTypedVariableDecl |
                   SpecialVarDecl
   ; if not a SpecialVarDecl then each type must be a ClassIdentifier
   ; if a SpecialVarDecl then its type must be text, integer, real, or value.cf
ForeachTerminationClause ::= TerminationWord BooleanExpression
TerminationWord ::= until | while
ForStatement ::= for Identifier from ArithmeticExpression
                 to ArithmeticExpression {by ArithmeticExpression}
                 do TaskBlockStatement
   ; note that the Identifier becomes a variable of type integer CaseStatement ::= case CaseSelectorExpression of CaseListElementStar
                  {otherwise TaskBlockStatement} end CaseSelectorExpression ::= NonBooleanExpression | AttributeExpression
CaseListElementStar ::= CaseListElement {; CaseListElementStar}
CaseListElement ::= CaseLabelList : TaskBlockStatement
CaseLabelList ::= CaseLabel {, CaseLabelList}
CaseLabel ::= ArithmeticConstant | TextConstant | AttributeName PrimitiveStatement ::= InvokeStatement | DeterminationStatement |
                       CreateStatement | DisplayStatement InvokeStatement ::= invoke TaskBlockName ({ExpressionStar})
   ; parse the arguments according to the types declared for the TaskBlock DeterminationStatement ::= DetermineStatement | SeekStatement | RuleOutStatement |
                           SeekWhetherStatement | RuleOutThatStatement DetermineStatement ::= determine AttributeDescriptor SeekStatement ::= seek AttributeDescriptor by SeekMeans
                  {whose.category.is RuleCategory}
   ; category part only applicable when SeekMeans is rules
RuleOutStatement ::= ruleout AttributeDescriptor by rules
                     {whose.category.is RuleCategory}
SeekMeans ::= SeekMeansName ; will include function name later
SeekMeansName ::= rules | asking
RuleCategory ::= Identifier SeekWhetherStatement ::= seek.whether AttributeDescriptor = SoughtValue
                         by rules {whose.category.is RuleCategory}
   ; Attribute must not be YESNO in the AttributeDescriptor
RuleOutThatStatement ::= ruleout.whether AttributeDescriptor = SoughtValue
                         by rules {whose.category.is RuleCategory}
```

; *Attribute must not be YESNO in the AttributeDescriptor*
SoughtValue ::= NonBooleanExpression
      ; *parse according to the type of the attribute*

CreateStatement ::= CreateOne | CreateAll

CreateOne   ::= *create.instance* ClassName {*called* InstanceVariable}
                  {*whose.parent.is* InstanceVariable} {*with* Conclusion}
                  ; *in Conclusion of with part, CFs must be 1.0 or -1.0*
   CreateAll   ::= *create.all.instances* ClassIdentifier
                  {*whose.parent.is* InstanceVariable}

DisplayStatement ::= *display* TextExpression

3. Functions

Function ::= *function* Identifier:SpecialTypeName({VarDeclStar})
                     FunctionDefinition;
          ; *note that the Identifier becomes both a FunctionName and a Variable*
          ; *allowable type names for the VarDeclStar include: integer, real, text,*
          *boolean, cf, value.cf, value.set, value.cf.set, instance, and attribute*
          ; *Functions may be declared to be of type: integer, real, text, boolean,*
          *cf, value.cf, value.set, or value.cf.set*
          ; *Functions are specifically excluded from returning: Instance, or attribute*

FunctionName ::= Identifier

FunctionDefinition ::= Expression | TaskBlockStatement
          ; *if an Expression, parse according to the function's declared type*
          ; *if a TaskBlockStatement, it must contain at least one statement that assigns*
             *a value to the function name*

AssignmentStatement ::= VariableName := Expression   ; *Type must agree*

4. Rules

Rule ::= Header *if* Premise *then* Conclusion;

Header ::= *rule* Identifier (TypedVariableDeclStar)

Premise ::= BooleanExpression | TryeachExpression
   TryeachExpression ::= *tryeach* RestrictedTypedVariableDecl Conclusion ::= *begin* ConclusionFormStar {;} *end* | ConclusionForm
   ConclusionFormStar ::= ConclusionForm {; ConclusionFormStar}
   ConclusionForm := FirstConclusionForm | SecondConclusionForm
      FirstConclusionForm ::= AttributeDescriptor {= NonBooleanExpression}
                        {( CertaintyFactor )} {ConclValueStar}
          ; *Attribute must be YESNO iff neither the NonBooleanExpression nor*
             *the ConclValueStar are present*
          ; *absence of a certainty factor indicates certainty (i.e., 1.0)*
         ConclValueStar ::= , NonBooleanExpression {( CertaintyFactor )}
                           {ConclValueStar}

```
SecondConclusionForm := AttributeDescriptor is
                                    ValueCFSetExpression {(CertaintyFactor)}
```

5. Declarations

```
VarDeclStar ::= VarDecl {, VarDeclStar}
  VarDecl ::= SpecialVarDecl | TypedVariableDecl
  SpecialVarDecl ::= Identifier : SpecialTypeName
    ; note that the Identifier becomes a Variable InstanceVarDecl ::= TypedVariableDeclStar | RestrictedTypedVariableDecl
TypedVariableDeclStar ::= TypedVariableDecl {, TypedVariableDeclStar}
  TypedVariableDecl ::= {Identifier :} ClassIdentifier
    ; note that the Identifier becomes a Variable
    ClassIdentifier ::= ClassName | ClassTypeName
      ClassName ::= Identifier
      ClassTypeName ::= Identifier RestrictedTypedVariableDecl ::= (TypedVariableDeclStar | BooleanExpression)

SpecialTypeName ::= ValueTypeName | OtherTypeName
  ValueTypeName ::= text | integer | real | boolean
  OtherTypeName ::= cf | value.cf | value.set | value.cf.set | attribute
```

6. Expressions

6.1. Expressions
```
ExpressionStar ::= Expression {, ExpressionStar}

Expression ::= ArithmeticExpression | BooleanExpression | TextExpression
               InstanceExpression | AttributeExpression | SetExpression |
               ValueCFExpression
  ; wherever possible, parse expressions predictively by looking at the
  type of the object that's expected NonBooleanExpression ::= ArithmeticExpression | TextExpression
```

6.2. Arithmetic Expressions
```
ArithmeticExpression ::= ArithmeticFactor {PlusOp ArithmeticExpression}
ArithmeticFactor ::= ArithmeticComponent {TimesOp ArithmeticFactor}
ArithmeticComponent ::= {MinusOp} ArithmeticTerm
ArithmeticTerm ::=  ArithmeticAttributeExpression | FunctionCall |
                                         ; Must be Arithmetic function
                    ParenthesizedArithmeticExpression | ArithmeticConstant |
                    ArithmeticVariable ParenthesizedArithmeticExpression ::= ( ArithmeticExpression )

ArithmeticVariable ::= Variable    ; currently scoped and typed as integer or real
ArithmeticAttributeExpression ::= AttributeDescriptor
          ; LegalValues must be of type Integer or Real
  PlusOp  ::= + | -
  TimesOp ::= * | /
  MinusOp ::= -
```

6.3. Text Expressions
```
TextExpression ::= TextFactor { ! TextExpression}
TextFactor ::= TextConstant | FunctionCall | ParenthesizedTextExpression |
               TextAttributeExpression | SpecialTextAttributeExpression |
               TextVariable | ArithmeticExpression
  ; If parsing a TextExpression in a display statement
```

*then look for SpecialTextAttributeExpression and not a TextAttributeExpression
else look for TextAttributeExpression and not a SpecialTextAttributeExpression
; FunctionCall must be fore a text function
; Arithmetic or Boolean Expression is converted to text*

```
ParenthesizedTextExpression ::= ( TextExpression )
TextAttributeExpression ::= AttributeDescriptor   ; LegalValues must be text
SpecialTextAttributeExpression ::= AttributeDescriptor   ; no restriction on the attribute TextVariable ::= Variable   ; currently scoped and typed as text
TextConstant ::= TextIdentifier | TextString
  TextIdentifier ::= Identifier
```

6.4. Function Calls

```
FunctionCall ::= FunctionName({ExpressionStar})
       ; parse expressions according to the type of the arguments declared for the function
```

6.5. Boolean Expressions

```
BooleanExpression ::= BooleanFactor {or BooleanExpression}
BooleanFactor ::= BooleanRelation {and BooleanFactor}
BooleanRelation ::= RelationalVFactor | RelationalTFactor |
                    RelationalBFactor | RelationalIFactor
BooleanComponent ::= {NegOp} BooleanTerm
   NegOp ::= not | ~
BooleanTerm ::= BooleanAttributeExpression | SpecialOpExpression |
            ExtraSpecialOpExpression | Predicate | BooleanVariable
            FunctionCall |
            BooleanConstant | ParenthesizedBooleanExpression
ParenthesizedBooleanExpression ::= ( BooleanExpression )
BooleanVariable ::= Variable   ; currently scoped and typed as boolean Predicate ::= ForallExpression | ExistsExpression
  ForallExpression ::= ForallWord InstanceVarDecl BooleanExpression
      ForallWord ::= forall | forall.existing
  ExistsExpression ::= ExistsWord InstanceVarDecl
      ExistsWord ::= exists | already.existing RelationalVFactor ::= ArithmeticExpression RelationalVOp RelationalVTerm
  RelationalVTerm ::= ArithmeticExpression {RelationalVOp RelationalVTerm}

RelationalTFactor ::= TextExpression RelationalTOp RelationalTTerm
  RelationalTTerm ::= TextExpression {RelationalTOp RelationalTTerm}

RelationalBFactor ::= BooleanComponent {RelationalBOp RelationalBFactor}

RelationalIFactor ::= InstanceVariable RelationalIOp RelationalITerm
  RelationalITerm ::= InstanceVariable {RelationalIOp RelationalITerm}

RelationalVOp ::= = | > | < | >= | <= | ~=
RelationalTOp ::= = | ~=
RelationalBOp ::= = | ~=
RelationalIOp ::= = | ~=

BooleanConstant ::= true | false

SpecialOpExpression := SpecialOperand RelationalOpSpecial {in} SpecialOperand
  SpecialOperand := ValueCFSetExpression | ValueSetExpression |
```

```
                    ValueCFExpression | NonBooleanExpression
; note that the order of attempts to parse a SpecialOperand is important
       RelationalOpSpecial ::= is | is.not |thought.not |
                               might.be | value.not.known |
                               definitely.is | definitely.not |
                               not.definitely.is | not.definitely.not
ExtraSpecialOpExpression ::= AttributeDescriptor AttrExpTailWord
; note that the AttributeDescriptor's attribute may be of any kind
     AttrExpTailWord ::= known | not.known | definite |
                         not.definite BooleanAttributeExpression ::= AttributeDescriptor {RelationalOpSpecial}
           ; Attribute must be YESNO AttributeDescriptor ::= AttributeNameField[InstanceExpressionStar]
      AttributeNameField ::= AttributeName | AttributeExpression
      AttributeName ::= Identifier | *
        ;note that the * is to be replaced with the appropriate AttributeName
      InstanceExpressionStar ::= InstanceExpression {, InstanceExpressionStar}
```

6.6. Instance Expressions
```
InstanceExpression ::= InstanceVariable
    InstanceVariable ::= Variable   ;currently scoped and typed as instance
```

6.7. Attribute Expressions
```
AttributeExpression ::= AttributeVariable
    AttributeVariable ::= $Variable  ; currently scoped and typed as attribute
```

6.8. Set Expressions
```
SetExpression ::= ValueSetExpression | ValueCFSetExpression ValueSetExpression ::= FunctionCall | ConstantValueSet | ValueSetVariable
        ; FunctionCall must involve a function of type value.set
       ConstantValueSet ::= ArithmeticConstantSet | TextConstantSet
          ArithmeticConstantSet ::= {ArithmeticConstantStar}
            ArithmeticConstantStar ::= ArithmeticConstant {ArithmeticConstantStar}
          TextConstantSet ::= {TextConstantStar}
            TextConstantStar ::= TextConstant {TextConstantStar}
       ValueSetVariable ::= Variable ; currently scoped and typed as value.set ValueCFSetExpression ::= FunctionCall | ValueCFSetVariable |
                             SpecialAttributeDescriptor
        ; FunctionCall must involve a function of type value.cf.set
       ValueCFSetVariable ::= Variable ; currently scoped and typed as value.cf.set
       SpecialAttributeDescriptor ::= AttributeDescriptor
           ; no restriction on Attribute's type
```

6.9. ValueCF Expressions
```
ValueCFExpression ::= FunctionCall | ValueCFVariable
       ; FunctionCall must involve a function of type value.cf
    ValueCFVariable ::= Variable ; currently scoped and typed as value.cf
```

7. Primitive Objects

Identifier

```
((RECORD (TerminalSymbol ATOM))
    MSG ((Interpret (self:TerminalSymbol) RESULT ATOM)))
```

Variable

```
((RECORD (Name VariableName))
    MSG ((Interpret ((SEND !ENVIRONMENT GetBinding self:Name)) RESULT Binding)
         (GetName (self:Name) RESULT VariableName)))
```

VariableName

```
((Identifier))
```

TextString

```
((RECORD (TerminalSymbol STRING))
    MSG ((Interpret (self:TerminalSymbol) RESULT STRING)))
```

ArithmeticConstant

```
((RECORD (TerminalSymbol NUMBER))
    MSG ((Interpret (self:TerminalSymbol) RESULT NUMBER)))
```

CertaintyFactor

```
(REAL
 CONSTRAINT ((ALWAYS (CERTAINLYNOT <= self <= CERTAINLY) (* --))))
```

8. Function definitions
*This section is not part of the grammar, but defines the collection of built-in functions.*

8.1. VALCF Functions
value(ValueCF)                  ; returns a Value
cf(ValueCF)                     ; returns a CF

8.2. Arithmetic Functions
sqrt(Number)                    ; returns a Real
expt(Number, Integer)           ; returns a Real
abs(Number)                     ; returns a Real
fix(Number)                     ; returns an Integer

8.3. Static Database Functions

```
legal.values((UNIONTYPE AttributeName ValueHierarchyName))     ; returns a ValueSet
```

8.4. Dynamic Database Functions

```
all.value.cfs(AttributeDescriptor)          ; returns a ValueCFSet
positive.value.cfs(AttributeDescriptor)     ; returns a ValueCFSet
negative.value.cfs(AttributeDescriptor)     ; returns a ValueCFSet
top.value.cf(AttributeDescriptor)           ; returns a ValueCF previous?(InstanceVariable, InstanceVariable)   ; returns Boolean
determined?(AttributeDescriptor)                ; returns Boolean
```

8.5. Text Manipulation Functions

```
capitalize(TextExpression)    ; returns Text
upper.case(TextExpression)    ; returns Text
lower.case(TextExpression)    ; returns Text bland.trans(InstanceVariable)                                       ; returns Text
    ; returns the text translation for an Instance using the Instance's
      BlandInstanceTranslation
full.trans(InstanceVariable)                                        ; returns Text
    ; returns the text translation for an Instance using the Instance's
      Name which has been derived from the Instance's Class' PrintId
```

What is claimed is:

1. A knowledge engineering tool comprising a computer having a stored program and memory for storing a knowledge base, said knowledge base including factual knowledge and judgmental knowledge, said judgmental knowledge including judgmental rules having premises for limiting the conditions in which the rules are applicable and conclusions for indicating the actions to perform when the rules are successfully applied, said factual knowledge including definitions of attributes that can take on values, said judgmental rules including rules having premises referring to attributes and rules concluding values for attributes, means for executing a built-in control procedure including means for interpreting the knowledge base, means for invoking and chaining said rules, and means for terminating the knowledge base search for a value, said knowledge base also including control knowledge supplied by a knowledge engineer to modify the built-in control procedure, and a language interpreter for executing the control knowledge to modify the built-in control procedure, whereby the control knowledge can be separated from the factual knowledge and judgmental knowledge and stored as a distinct portion of the knowledge base.

2. A knowledge engineering tool as set forth in claim 1 which includes means for creating, editing and augmenting said knowledge base.

3. A knowledge engineering tool as set forth in claim 1 wherein said knowledge base includes, certainty factors for said values of attributes and rules, predicates responsive to the certainty factor of the values of attributes, declarations defining whether attributes are single-valued or multi-valued, declarations defining legal values for attributes, declarations defining that certain values of said attributes are of a prescribed type.

4. A knowledge engineering tool as set forth in claim 1 which includes interface means with predefined commands for a user to load said knowledge base, start said consultation, end said consultation, and save the results of said consultation.

5. A knowledge engineering tool as set forth in claim 1 which includes means for displaying to the user conclusions of the rules applied.

6. A knowledge engineering tool as set forth in claim 1 which includes means for declaring classes of objects, means for declaring a vector of said classes for each of said attributes, and means for creating instances of said classes.

7. A knowledge engineering tool as set forth in claim 6 wherein said means for creating instances of said classes includes means for implicitly creating instances of a class when a rule is applied having a premise including an attribute defined on a vector of classes including said class.

8. A knowledge engineering tool as set forth in claim 6 wherein said knowledge base includes judgmental rules having premises including quantified conditions determining whether a specified condition succeeds for a specified set of instances.

9. A knowledge engineering tool as set forth in claim 6 which includes means for producing information as to why an instance was created.

10. A knowledge engineering tool as set forth in claim 1 wherein said knowledge base includes declarations describing phrases to use when translating into conventional humanly readable language, knowledge base declarations of classes, class types, instances, control blocks, functions, value hierarchies, and attributes.

11. A knowledge engineering tool as set forth in claim 1 wherein said knowledge base includes declarations defining questions to ask a user to determine values.

12. A knowledge engineering tool as set forth in claim 1 which includes means for receiving values from the user for specified attributes.

13. A knowledge engineering tool as set forth in claim 1 which includes means for receiving uncertain values from the user for specified attributes.

14. A knowledge engineering tool as set forth in claim 1 which includes means for checking values for an attribute against predefined legal values for that attribute.

15. A knowledge engineering tool as set forth in claim 1 which includes means for translating said control knowledge into a conventional humanly readable language.

16. A knowledge engineering tool as set forth in claim 1 which includes means for explaining why and how said control knowledge was used at particular points during a particular consultation with a user.

17. A knowledge engineering tool as set forth in claim 1 which includes means defining a precise language having syntax for said control knowledge.

18. A knowledge engineering tool as set forth in claim 1 wherein said control knowledge is encoded in an imperative procedural language defining a sequence of steps.

19. A knowledge engineering tool as set forth in claim 18 wherein the imperative control language is applicative.

20. A knowledge engineering tool as set forth in claim 1 wherein said control knowledge is expressed as a number of discrete control blocks.

21. A knowledge engineering tool as set forth in claim 20 wherein a control block includes statements in a control language.

22. A knowledge engineering tool as set forth in claim 21 wherein said control language is an imperative procedural language.

23. A knowledge engineering tool as set forth in claim 21 wherein some of said statements request that particular attributes be determined.

24. A knowledge engineering tool as set forth in claim 21 wherein some of said statements attempt to reach conclusions about attributes using prescribed means.

25. A knowledge engineering tool as set forth in claim 21 wherein some of said statements attempt to reach conclusions about attributes by applying specified sets of judgmental rules.

26. A knowledge engineering tool as set forth in claim 21 wherein some of said statements display arbitrary text to the user.

27. A knowledge engineering tool as set forth in claim 21 wherein some of said statements execute other specified control blocks.

28. A knowledge engineering tool as set forth in claim 21 wherein said attributes are defined on predetermined vectors of classes of objects, and some of said statements cause explicit instantiation of specified classes.

29. A knowledge engineering tool as set forth in claim 1 which includes means for indicating that the execution of said control knowledge to run a consultation is to commence in a prescribed control block.

30. A knowledge engineering tool as set forth in claim 1 wherein said attributes are defined on predetermined vectors of classes of objects, and further including means for causing instances of a class to be created.

31. A knowledge engineering tool as set forth in claim 30 wherein said control knowledge comprises a plurality of discrete control blocks, and means for associating selected post-instantiation control blocks with selected classes of objects.

32. A knowledge engineering tool as set forth in claim 30 wherein said instances of a class are implicitly caused to be created.

33. A knowledge engineering tool as set forth in claim 32 wherein said control knowledge comprises a plurality of discrete control blocks and said interpreter comprises means for interrupting the execution of said control language to execute the control knowledge statements in selected post-instantiation control blocks associated with a selected class when an instance of said class has been created.

34. A knowledge engineering tool as set forth in claim 1 wherein said control knowledge includes control blocks specifying methods for determining the values of prescribed attributes.

35. A knowledge engineering tool as set forth in claim 34 which includes means for interrupting the application of a rule in order to execute said control block to determine the value of an attribute in the premise of said rule.

36. A knowledge engineering tool as set forth in claim 34 which includes means for interrupting the execution of a control block in response to an explicit request within the control block for determination of one of said prescribed attributes.

37. A knowledge engineering tool as set forth in claim 1 wherein said control knowledge includes a plurality of control blocks, some of which are post-determination control blocks associated with selected attributes.

38. A knowledge engineering tool as set forth in claim 37 which includes post-determination control blocks for accessing and using concluded values of said associated attributes.

39. A knowledge engineering tool as set forth in claim 37 which includes means for executing a post-determination control block after a value has been determined for an attribute associated with said control block.

40. A knowledge engineering tool as set forth in claim 1 wherein said knowledge base includes user-defined functions and said judgmental rules include calls to said user defined functions.

41. A knowledge engineering tool as set forth in claim 1 wherein said attributes are defined on predetermined vectors of classes of objects, and said knowledge base includes attributes declared to be subsumed by a Boolean attribute defined on the same vector of classes and class types.

42. A knowledge engineering tool as set forth in claim 41 wherein each subsumed Boolean attribute is concluded to be definitely false when a subsuming attribute is determined to be definitely false.

43. A knowledge engineering tool as set forth in claim 41 wherein each subsumed attribute that is non-Boolean but that takes on enumerable values is concluded to be definitely not each of those values when its subsuming attribute is determined to be definitely false.

44. A knowledge engineering tool as set forth in claim 41 wherein each subsumed attribute that is non-Boolean but that takes on non-enumerable values is designated as being determined, with no conclusions being made for any of its values, when a subsuming attribute is determined to be definitely false.

45. A knowledge engineering tool as set forth in claim 41 wherein a subsuming attribute is concluded to be definitely true when a definite value is concluded for a subsumed attribute.

46. A knowledge engineering tool as set forth in claim 41 which includes means for attempting to first determine a subsuming attribute whenever an attempt is made to determine a subsumed attribute.

47. A knowledge engineering tool as set forth in claim 1 which includes means for specifying a finite set of legal values of a declared type for any attribute, and means for constraining that attribute to take on values from that set.

48. A knowledge engineering tool as set forth in claim 47 wherein said finite set of legal values is a hierarchy of values.

49. A knowledge engineering tool as set forth in claim 1 which includes means for designating selected system states as points of articulation for interruption of the built-in control procedure for execution of said control knowledge.

50. A knowledge engineering tool comprising a computer system having a stored program and memory for storing a knowledge base,
    said knowledge base including control knowledge, factual knowledge and judgmental knowledge, said judgmental knowledge including judgmental rules having premises for limiting the conditions in which the rules are applicable and conclusions for indicating the actions to perform when the rules are successfully applied,
    a built-in control procedure providing a base-level of control of the system, points of articulation in said built-in control procedure to allow the execution of specified portions of the control knowledge when said points are reached, and
    a control program for producing system activities in accordance with said built-in control procedure and said control knowledge by interpreting and executing said built-in control procedure and said control knowledge, whereby said control knowledge can be separated from said factual knowledge and judgmental knowledge and stored as a distinct portion of the knowledge base.

51. A knowledge engineering tool as set forth in claim 50 further comprising means for permitting a user to define said points of articulation.

52. A knowledge engineering tool as set forth in claim 51 further comprising means for permitting the user to define a prescribed action sequence to be effected in response to prescribed conditions existing when said points of articulation are reached.

53. A knowledge engineering tool as set forth in claim 50 wherein said points of articulation include a point where a consultation has just begun.

54. A knowledge engineering tool as set forth in claim 50 wherein the built-in control procedure includes means for defining prescribed conditions that must exist for specified portions of the control knowledge to be executed when respective points of articulation are reached.

55. A knowledge engineering tool as set forth in claim 50 wherein said factual knowledge includes definitions of classes and said points of articulation include at least one point where an instance of class is created.

56. A knowledge engineering tool as set forth in claim 50 wherein said factual knowledge includes definitions of attributes that can take on particular values and said points of articulation include at least one point where an attribute has been determined.

57. A knowledge engineering tool as set forth in claim 50, wherein said factual knowledge includes definitions of atrributes that can take on particular values and said points of articulation include at least one point where an attribute needs to be determined.

58. A knowledge engineering tool comprising a computer having a stored program and memory for storing a knowledge base,
    means for creating, editing and augmenting a knowledge base that includes control knowledge, factual knowledge and judgmental rules about a particular problem domain,
    said knowledge base specifically including,
        facts and rules having certainty factors,
        declarations defining attributes that can take on values and respective certainty factors,
        predicates for attributes responsive to their respective certainty factors,
        judgmental rules concluding values for attributes,
        declarations defining whether attributes are single-valued or multivalued,
        declarations defining legal values for attributes,
        judgmental rules having premises referring to attributes not yet determined,
    means for interpreting the knowledge base to run an interactive advisory consultation with a user to advise the user on a selected aspect of said problem,
    interface means with predefined commands for a user to load said knowledge base, start said consultation, end said consultation, and save the results of said consultation,
    interface means for a user to ask questions and to receive responsive information, including the contents of the knowledge base, the current values of an attribute, why an attribute was determined, conclusions reached by said interpreting means, how an attribute was determined, and why a query was posed,
    means for generating a record of a consultation, including an ordered list of rules applied and blocks of control knowledge invoked during the consultation,
    means for determining the value and certainty factor of any atrribute, means for invoking and chaining said rules, means for selecting certainty factors for concluded values by combining certainty factors of attributes in the premises of said rules with the certainty factors of said rules, means for terminating the knowledge base search for determining a single-valued attribute when a value is found with a certainty factor above a prescribed level, and for determining a multivalued attribute when all values are determined, means for generating a query of the user for values of an attribute and for receiving values from the user in response to such a query, means for displaying to the user conclusions of the rules applied, means for declaring classes of objects and implicitly causing instances of a class to be created, and a language interpreter for executing imperative procedural language and providing a corresponding interpretation for the control knowledge, whereby the control knowledge can be separated from the factual knowledge and judgmental rules and stored as a distinct portion of the knowledge base.

59. A computer operating under control of a stored program for (a) enabling a knowledge engineer to generate a knowledge base in the memory of the computer including control knowledge, factual knowledge, and judgmental rules for encoding knowledge about a particular problem domain, and for (b) interpreting the knowledge base to conduct a consultation with a user regarding a specified problem in said problem domain, said stored program including a user interface for recognizing a predefined set of control commands, a question and answer facility recognizing questions from the user and formatting responsive answers including an explanation of the basis for the answers, and an inference engine for applying said judgmental rules to determine the responsive answers to said questions and for resolving conflicting conclusions of said judgmental rules, wherein the improvement comprises:

said knowledge base has a separate portion encoding said control knowledge separate from said factual knowledge and said judgmental rules, said control knowledge being encoded in an applicative and imperative procedural language defining a sequence of steps for conduting said consultation with the user, and further comprising language interpreter means for executing said imperative procedural language.

60. The computer as claimed in claim 59, wherein said separate portion of said knowledge base encoding said control knowledge comprises a plurality of discrete control blocks, each control block including statements in said imperative procedural language, said procedural language including separate statements to ask the user a question and obtain a responsive answer, apply a specified set of said judgmental rules, display to the user the conclusions of the rules applied, and to execute another specified control block.

61. The computer as claimed in claim 60, wherein said factual knowledge includes means for declaring at least one class of objects, said knowledge base includes means for causing distinct instances of said class to be created when the knowledge base is interpreted during a consultation, wherein said plurality of discrete control blocks includes at least one post-instantiation control block associated with said class, and wherein said procedural language interpreter comprises means for interrupting the execution of said procedural language to execute the procedural language statements in the post-instantiation control block associated with said class when an instance of said class has been created.

62. The computer as claimed in claim 60 wherein said factual knowledge includes means for defining at least one attribute capable of having a respective value, one of the judgmental rules has a premise conditioned on the value of said attribute so that said inference engine requires the value of said attribute to apply said rule, said plurality of discrete control blocks includes at least one determination control block defining a predetermined method for determining a value for said attribute, and said language interpreter includes means for interrupting execution of said procedural language to execute the procedural langauge statements in the determination control block when said inference engine applies said rule and requires the determination of a value for said attribute.

63. The computer as claimed in claim 60, wherein said factual knowledge includes means for defining at least one attribute capable of having a respective value, one of the judgmental rules concludes a value for said attribute when it is applied by said inference engine, said plurality of discrete control blocks includes a post-determination control block using the concluded value for said attribute, and said language interpreter means includes means for interrupting the execution of said procedural language to execute the procedural language statements in the post-determination control block when said judgmental rule determines a value for said attribute.

64. The computer as claimed in claim 59, wherein said factual knowledge base includes means for defining attributes capable of having respective values, and means for defining designated ones of the attributes as Boolean attributes having values from the set of values including true and false, and means for defining designated ones of the attributes as subsumed by designated respective ones of said Boolean attributes, and wherein said inference engine includes means for determining the value of an attribute by testing whether the attribute is subsumed by one of said Boolean attributes determining the value of any such Boolean attribute, and determining that the value of the subsumed attribute is known to be irrelevant when the value of such Boolean attribute is false.

65. The computer as claimed in claim 64, wherein said inference engine comprises post-determination means, operative when a value for an attribute is determined, for testing whether the attribute is subsumed by one of said Boolean attributes, and determining any such Boolean attribute to be true when the subsumed attribute is known to have a value.

66. A computer having a memory storing a predefined knowledge base including control knowledge, factual knowledge, and judgmental rules for encoding knowledge about a particular problem domain, said factual knowledge including definitions of classes of objects, attributes defining characteristics of said objects, and structures of said classes and attributes, said computer operating under control of a stored program interpreting the knowledge base to conduct a consultation with a user regarding a specified problem in said problem domain, said stored program including means for creating instances of said classes representing particular objects, a question and answer facility for recognizing questions from the user and formatting responsive answers including an explanation of the basis for the answers, and means for determining values for said attributes and said instances of said classes describing said characteristics of said particular objects, an inference engine for applying said judgmental rules to determine the responsive answers to said questions and for resolving conflicting conclusions of said judgmental rules, wherein the improvement comprises:

said knowledge base has a separate portion encoding said control knowledge separate from said factual knowledge and said judgmental rules, said control knowledge being encoded in an imperative procedural language defining a sequence of steps for conducting said consultation with the user, and further comprising language interpreter means for executing said imperative procedural language, said separate portion of said knowledge base encoding said control knowledge comprises a plurality of discrete control blocks, each control block including statements in said imperative procedural language, said statements including separate statements to ask the user a question and obtain a responsive answer, apply a specific set of said judgmental rules, display to the user the conclusions of the rules applied, and to execute another specified control block, said plurality of control blocks including at least one post-instantiation control block associated with at least one of said classes, at least one determination control block defining a predetermined method for determining a value for at least one of said attributes being undetermined and being included in the premise of one of said judgmental rules, and at least one post-determination control block using a determined value for a determined attribute, and wherein said procedural language interpreter comprises means for interrupting the execution of said procedural language to execute the procedural language statements in the post-instantiation control block when an instance of the associated class is created, means for interrupting execution of said procedural language to execute the procedural language statements in the determination control block when said inference engine applies said judgmental rule including said undetermined attribute, and said language interpreter means includes means for interrupting the execution of said procedural language to execute the procedural language statements in the post-determination control block when said judgmental rule determines the value for said undetermined attribute.

67. The computer as claimed in claim 66, wherein said factual knowledge base includes means for defining designated ones of the attributes as Boolean attributes having values from the set of values including true and false, and means for defining designated ones of the attributes as subsumed by designated respective ones of said Boolean attributes, and wherein said inference engine includes means for determining the value of an attribute by testing whether the attribute is subsumed by one of said Boolean attributes determining the value of any such Boolean attribute, and determining that the value of the subsumed attribute is known to be irrelevant when the value of such Boolean attribute is false.

68. The computer as claimed in claim 67, wherein said inference engine comprises post-determination means, operative when a value for an attribute is determined, for testing whether the attribute is subsumed by one of said Boolean attributes, and determining any such Boolean attribute to be true when a value is known for the subsumed attribute.

69. The computer as claimed in claim 66, wherein said factual knowledge base includes means for defining at least one of said attributes as multivalued, means for defining hierarchies of legal values for said multivalued attribute, and wherein said inference engine comprises means for determining certainty factors for concluded legal values of said attribute, and said knowledge base interpreter includes means for propagating the determined certainty factors through said hierarchy of legal values.

* * * * *